(12) United States Patent
Lu et al.

(10) Patent No.: US 11,314,853 B2
(45) Date of Patent: Apr. 26, 2022

(54) METHOD AND APPARATUS FOR IMPLEMENTING LOGGING-ON OF HARDWARE TO WINDOWS SYSTEM WITH VERSION 10 OR HIGHER

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

(*) Notice: Subject to any disclaimer, the term of this patent is extended or adjusted under 35 U.S.C. 154(b) by 178 days.

(21) Appl. No.: 16/770,569

(22) PCT Filed: Dec. 24, 2018

(86) PCT No.: PCT/CN2018/123211
§ 371 (c)(1),
(2) Date: Jun. 5, 2020

(87) PCT Pub. No.: WO2019/137193
PCT Pub. Date: Jul. 18, 2019

(65) Prior Publication Data
US 2021/0165868 A1 Jun. 3, 2021

(30) Foreign Application Priority Data
Jan. 10, 2018 (CN) .......................... 201810021013.5

(51) Int. Cl.
*G06F 21/00* (2013.01)
*G06F 21/44* (2013.01)
(Continued)

(52) U.S. Cl.
CPC .............. *G06F 21/44* (2013.01); *G06F 7/588* (2013.01); *G06F 21/54* (2013.01); *G06F 21/602* (2013.01); *G06F 2221/0751* (2013.01)

(58) Field of Classification Search
CPC ........ G06F 21/602; G06F 21/54; G06F 7/588; G06F 21/44
See application file for complete search history.

(56) References Cited

U.S. PATENT DOCUMENTS

2007/0174429 A1* 7/2007 Mazzaferri ........... G06F 3/1462
709/218
2015/0350178 A1* 12/2015 Yang ....................... G06F 21/31
713/168
2015/0358820 A1 12/2015 Li

FOREIGN PATENT DOCUMENTS

CN 1822541 A 8/2006
CN 102811211 A 12/2012
(Continued)

OTHER PUBLICATIONS

International Search Report for PCT/CN2018/123211.
First Office Action of the prior Chinese application.

*Primary Examiner* — Anthony D Brown
*Assistant Examiner* — Rodman Alexander Mahmoudi
(74) *Attorney, Agent, or Firm* — J.C. Patents

(57) ABSTRACT

A method and an apparatus for implementing logging on of hardware to windows system with version 10 or higher, including: obtaining, by a computer, a first data package according to a registration index corresponding to a device identification of a hardware device when monitoring insertion of the hardware device, encrypting first data package to obtain first encrypted result using first encryption key stored and sending the first encrypted result and the registration index to the hardware device for verifying; when verifying successful, generating third encryption value and fourth encryption value according to second device key stored corresponding to registration index and third random number and second session random number in first encrypted result, encrypting third encryption value and fourth encryp- (Continued)

tion value to obtain second encrypted result using second encryption key, and sending second encrypted result to the computer for verifying; permitting logon when verifying is successful, otherwise refusing logon.

20 Claims, 5 Drawing Sheets

(51) Int. Cl.
*G06F 7/58* (2006.01)
*G06F 21/54* (2013.01)
*G06F 21/60* (2013.01)

(56) References Cited

FOREIGN PATENT DOCUMENTS

| | | | |
|---|---|---|---|
| CN | 102831335 | A | 12/2012 |
| CN | 104104687 | A | 10/2014 |
| CN | 104639516 | A | 5/2015 |
| CN | 106034028 | A | 10/2016 |
| CN | 107241192 | A | 10/2017 |
| CN | 107563176 | A | 1/2018 |
| CN | 108256309 | A | 7/2018 |

* cited by examiner

METHOD AND APPARATUS FOR IMPLEMENTING LOGGING-ON OF HARDWARE TO WINDOWS SYSTEM WITH VERSION 10 OR HIGHER

CROSS-REFERENCE TO RELATED APPLICATIONS

This application is a national stage of International Application No. PCT/CN2018/123211, filed on Dec. 24, 2018, which claims priority to Chinese Patent Application No. 201810021013.5, filed on Jan. 10, 2018 and entitled "METHOD AND APPARATUS FOR IMPLEMENTING LOGGING ON OF HARDWARE TO WINDOWS SYSTEM WITH VERSION 10 OR HIGHER". The disclosure of the above patent application is incorporated herein by reference in its entirety.

TECHNICAL FIELD

The disclosure relates to the field of information security, more particularly, to a method and an apparatus for implementing logging-on of hardware to windows system.

BACKGROUND

With development of technology and application of computer and network, people pay more attention on accompanied security problem of computer system. Once the computer system is damaged, great loss will be brought to users. With development of new technology such as cloud computing, big data and the like, for operating system, especially server operating system bearing important data and business application of user, requirement for security becomes higher and higher, in which, security for user's password is the most important. At present, various kinds of password sniffer tools, keypad input monitoring program and injection program for key processes of operating system are hackers' favorite. Hackers can obtain a user's password for logging on to operating system easily by using the tools above. For example, Hackers can use a mimikatz tool which is popular on network to obtain a password of a user who has logged on easily.

The operating systems in the prior art mainly are Windows operating systems. It is the most normal way to log on by inputting a password or a PIN code. But it is easy to be divulged due to that a string of number is needed to be input, which leads to great security vulnerability. Before releasing of Windows 10, the way for hardware to locally log on to Windows only support bioidentification. The bioidentification has highly requirement for hardware and software, which is hard to implement.

SUMMARY

In order to solve the problem in the prior art, the present disclosure provides a method and an apparatus for implementing logging-on of hardware to windows system with version 10 or higher.

The present disclosure provides a method for implementing logging-on of hardware to windows system with version 10 or higher, which includes an authentication process. The authentication process includes:

Step S1, obtaining, by a computer, a device identification of a hardware device, and obtaining a first data package according to a registration index corresponding to the device identification when an insertion of the hardware device is monitored, where the first data package comprises: a first random number, a second random number, a first session random number and a first encryption value;

Step S2, encrypting, by the computer, the first data package to obtain a first encrypted result using a first encryption key stored; and sending, the first encrypted result and the registration index to the hardware device;

Step S3, decrypting, by the hardware device, the first encrypted result received to obtain a first decrypted result using a second encryption key stored, and verifying a second encryption value in the first decrypted result using a second configuration service frame key stored and corresponding to the registration index received, a third random number in the first decrypted result, a fourth random number in the first decrypted result, and a second session random number in the first decrypted result, when the verifying is successful, going to Step S4; and when the verifying is failed, returning error to the computer, and when the computer receives the error information, refusing, by the computer, logging on;

Step S4, generating, by the hardware device, a third encryption value and a fourth encryption value according to a second device key stored and corresponding to the registration index, the third random number in the first decrypted result and the second session random number in the first decrypted result, encrypting the third encryption value and the fourth encryption key to obtain a second encrypted result using the second encryption key, and sending the second encrypted result to the computer;

Step S5, decrypting, by the computer, the second encrypted result received to obtain a second decrypted result using the first encryption key, verifying the second decrypted result using a first device key stored and corresponding to the registration index, the first random number, and the first session random number, when the verifying is successful, permitting logon, and when the verifying is failed, refusing logon.

Further, after the obtaining the device identification of the hardware device and before the obtaining the first data package according to the registration index corresponding to the device identification, the method further comprises: determining, by the computer, whether the hardware device has been registered, when the hardware device has been registered, obtaining the first data package according to the registration index corresponding to the device identification, and when the hardware device has not been registered, refusing logon.

Further, the determining, by the computer, whether the hardware device has been registered includes:

obtaining, by the computer, a registration table, and determining whether the device identification obtained and a device identification in the registration table are matched, when the device identification obtained and the device identification in the registration table are matched, determining that the hardware device has been registered; and when the device identification obtained and the device identification in the registration table are matched, determining that the hardware device has not been registered.

Further, in the Step S1, before the obtaining the device identification of the hardware device, the method further includes:

sending, by the computer, an instruction for obtaining an application to the hardware device; returning, by the hardware device, data to the computer after receiving the instruction for obtaining an application; receiving, by the computer, the data returned by the hardware device, and determining whether the application is obtained successfully; when the application is obtained successfully, obtaining, the device identification of the hardware device; and when the application is not obtained successfully, refusing logon.

Further, the obtaining the device identification of the hardware device in Step S1, comprises: sending, by the computer, an instruction for obtaining the device identification to the hardware device; returning, by the hardware device, the device identification of the hardware device to the computer after receiving the instruction for obtaining the device identification; and receiving and storing, by the computer, the device identification returned by the hardware device.

Further, before the obtaining the first data package according to the registration index corresponding to the device identification, the method comprises: splicing, by the computer, the second random number, the first random number, and the first session random number to obtain a first spliced result, and encrypting the first spliced result to obtain the first encryption value using the first configuration service frame key stored and corresponding to the registration index according to a preset algorithm;

in Step S3, the verifying a second encryption value in the first decrypted result using a second configuration service frame key stored and corresponding to the registration index received, a third random number in the first decrypted result, a fourth random number in the first decrypted result, and a second session random number in the first decrypted result, comprises: splicing, by the hardware device, the third random number in the first decrypted result, the fourth random number in the first decrypted result and the second session random number in the first decrypted result, to obtain a second spliced result, encrypting the second spliced result to obtain the first encrypted result using the second configuration service frame key stored and corresponding to the registration index received according to a preset algorithm; determining whether the first encrypted result is identical to the second encryption value in the first decrypted result; when the first encrypted result is identical to the second encryption value, the verifying is successful, and when the first encrypted result is not identical to the second encryption value, the verifying is failed.

Further, in Step S4, the generating, by the hardware device, a third encryption value and a fourth encryption value according to a second device key stored and corresponding to the registration index, the third random number in the first decrypted result and the second session random number in the first decrypted result, comprises: encrypting, by the hardware device, the third random number in the first decrypted result to obtain the third encryption value using the second device key stored and corresponding to the registration index according to a preset algorithm; and encrypting the second session random number in the first decrypted result to obtain the fourth encryption value using the second device key according to a preset algorithm;

In Step S5, the verifying the second decrypted result using a first device key stored and corresponding to the registration index, the first random number, and the first session random number, comprises: encrypting, by the computer, the first random number stored to obtain a fifth encryption value using the first device key stored and corresponding to the registration index according to a preset algorithm; encrypting the first session random number stored according to a preset algorithm to obtain a sixth encryption value; determining whether the fifth encryption value and the sixth encryption value match the second decrypted result; when the fifth encryption value and the sixth encryption value match the second decrypted result, the verifying is success-ful, when the fifth encryption value and the sixth encryption value do not match the second decrypted result, the verifying is failed, and refusing logon.

Further, the method further includes a logout process, wherein the logout process includes:

Step P1, obtaining, by the computer, a registering table when receiving deleting information selected by a user;

Step P2, determining, by the computer, whether the deleting information received matches information in the registration table, when the deleting information received matches information in the registration table, going to Step P3, and when the deleting information received does not match information in the registration table, refusing logging out; and Step P3, prompting, by the computer, the user to confirm the deleting operation, deleting the information corresponding to the deleting information selected by the user from the registration table when receiving the confirming deleting information from the user, and ending the logout process.

Further, the method further includes a registration process, the registration process includes:

Step A1, initializing and monitoring, by the computer, the hardware device when receiving triggering information for registration;

Step A2, obtaining, by the computer, the device identification of the hardware device and a registration table, when an insertion of the hardware device is monitored;

Step A3, determining, by the computer, whether the device identification obtained matches the device identification of the registration table, when the device identification obtained matches the device identification of the registration table, prompting that the hardware device has been registered currently and the registration process is ended; otherwise, and when the device identification obtained does not match the device identification of the registration table, going to Step A4;

Step A4, negotiating, by the computer, an encryption key with the hardware device and storing the encryption key;

Step A5, sending, by the computer, a registration instruction to the hardware device;

Step A6, receiving, by the hardware device, the registration instruction, updating the registration index, generating a second device key and a second configuration service frame key and storing the second device key and the second configuration service frame key corresponding to the registration index, and encrypting the second device key and the second configuration service frame key to obtain a third encrypted result using the second encryption key stored;

Step A7, sending, by the hardware device, the third encrypted result and the registration index to the computer;

Step A8, storing, by the computer, the registration index received, and decrypting the third encrypted result received using the first encryption key stored;

Step A9, storing, by the computer, the device identification, the first device key obtained by decrypting the third encrypted result and the first configuration service frame key in the registration table corresponding to the registration index.

Further, before the obtaining the device identification of the hardware device in Step A2, the method further includes:

sending, by the computer, an instruction for obtaining an application to the hardware device; returning, by the hardware device, data to the computer after receiving the instruction for obtaining an application; receiving, by the computer, the data returned by the hardware device and determining whether the application is obtained successfully according to the data received, when the application is obtained successfully, obtaining the device identification of the hardware device; and when the application is not obtained successfully, prompting that the registration is failed.

Further, the obtaining the device identification of the hardware device in Step A2, includes:

sending, by the computer, an instruction for obtaining an application to the hardware device; returning, by the hardware device, data to the computer after receiving the instruction for obtaining an application; receiving, by the computer, the data returned by the hardware device, and determining whether the application is obtained successfully; when the application is obtained successfully, obtaining, the device identification of the hardware device; and when the application is not obtained successfully, refusing logon.

Further, the obtaining the device identification of the hardware device in Step A2 includes: sending, by the computer, an instruction for obtaining the device identification to the hardware device; returning, by the hardware device, the device identification of the hardware device to the computer after receiving the instruction for obtaining the device identification; and receiving and storing, by the computer, the device identification returned by the hardware device.

Further, between Step A3 and Step A4, the method further includes: prompting, by the computer, a user to input a user registration name; and, receiving and storing, by the computer, the user registration name input by the user.

Further, Step A4 includes:

Step A41, generating and storing, by the computer, a first key, encrypting a first preset data to obtain a fifth encrypted result using the first key according to a preset algorithm, and sending the first key and the fifth encrypted result to the hardware device;

Step A42, receiving, by the hardware device, the first key and the fifth encrypted result sent by the computer, decrypting the fifth encrypted result using the first key, determining whether a decrypted result is the first preset data, when the decrypted result is the first preset data, going to Step A3, and when the decrypted result is not the first preset data, returning registration error information to the computer, and ending the process;

Step A43, generating, by the hardware device, a second key, generating a second encryption key according to the first key and the second key and storing the second encryption key; encrypting the decrypted result to obtain a sixth encrypted result using the second key according to a preset algorithm, and sending the second key and the sixth encrypted result to the computer;

Step A44, receiving, by the computer, the second key and the sixth encrypted result sent by the hardware device, decrypting the sixth encrypted result using the second key, determining whether a decrypted result is the first preset data, when the decrypted result is the first preset data, going to Step A45; and when the decrypted result is not the first preset data, prompting that the registration is failed, and ending the process;

Step A45, generating, by the computer, a first encryption key according to the first key stored and the second key obtained, and storing the first encryption key.

Further, the generating a second encryption key according to the first key and the second key includes: splicing first eight bytes of the first key and last eight bytes of the second key to obtain the second encryption key; and Step A45 includes: splicing, by the computer, the first eight bytes of the first key and the last eight bytes of the second key to obtain and store the first encryption key.

Further, before Step A9, the method further includes:

Step B1, popping up, by the computer, a box for verifying PIN code, and prompting the user to input a PIN code; and Step B2, receiving, by the computer, the PIN code input by the user, and determining whether the PIN code input by the user is identical to the PIN code stored, when the PIN code input by the user is identical to the PIN code stored, executing Step A9, and when the PIN code input by the user is not identical to the PIN code stored, reporting an error.

The present disclosure provides an apparatus for implementing logging-on of hardware to windows system with version 10 or higher, which includes a computer and a hardware device; the computer includes:

a first obtaining module, configured to obtain a device identification of the hardware device when an insertion of the hardware device is monitored by the computer in an authentication process;

a second obtaining module, configured to obtain a first data package according to a registration index corresponding to the device identification obtained by the first obtaining module, the first data package includes: a first random number, a second random number, a first session random number and a first encryption value;

a first encrypting module, configured to encrypt the first data package obtained by the second obtaining module to obtain a first encrypted result by using the first encryption key stored;

a first sending module, configured to send the registration index and the first encrypted result obtained by the first encrypting module to the hardware device;

a first receiving module, configured to receive a second encrypted result or error information sent by the hardware device in the authentication process;

a first decrypting module, configured to decrypt the second encrypted result received by the first receiving module to obtain a second decrypted result using the first encryption key stored;

a first verifying module, configured to verify the second decrypted result obtained by the first decrypting module using a first device key stored and corresponding to the registration index, the first random number and the first session random number;

a logon permitting module, configured to permit logging on when the first verifying module verifies successfully; and a logon refusing module, configured to refuse logging on when the first receiving module receives the error information or the first verifying module verifies unsuccessfully; and the hardware device includes:

a second receiving module, configured to receive the first encrypted result and the registration index which are sent by the computer in the authentication process;

a second decrypting module, configured to decrypt the first encrypted result received by the second receiving module to obtain the first decrypted result using a second encryption key stored;

a second verifying module, configured to verify a second encryption value in the first decrypted result received by the second receiving module using a second configuration service frame key stored and corresponding to the registration index received by the second receiving module, and a third random number, a fourth random number and a second session random number which are in the first decrypted result obtained by the second decrypting module;

a first generating module, configured to generate a third encryption value and a fourth encryption value according to a second device key stored and corresponding to the registration index received by the second receiving module, the third random number and the second session random number in the first decrypted result obtained by the second receiving module when verifying of the second verifying module is successful;

a second encrypting module, configured to encrypt the third encryption value and the fourth encryption value which are generated by the first generating module to obtain a second encrypted result using the second encryption key; and a second sending module, configured to return error information to the computer when verifying of the second verifying module is failed; and further configured to send the second encrypted result obtained by the second encrypting module to the computer.

Further, the computer further includes:

a first determining module, configured to determine whether the hardware device has been registered in the authentication process, when the hardware device has been registered in the authentication process, trigger the second obtaining module, and when the hardware device has not been registered in the authentication process, trigger a logon refusing module; and the logon refusing module is further configured to refuse logon when determining result of the first determining module is that the hardware device has not been registered in the authentication process.

Further, the first determining module includes:

a first obtaining unit, configured to obtain a registration table; and a first determining unit, configured to determine whether the device identification obtained by the first obtaining module matches the device identification in the registration table obtained by the first obtaining unit, when the device identification obtained by the first obtaining module matches the device identification in the registration table obtained by the first obtaining unit, determine that the hardware has been registered; and when the device identification obtained by the first obtaining module does not match the device identification in the registration table obtained by the first obtaining unit, determine that the hardware has not been registered.

Further, the computer further includes a second determining module;

the first sending module is further configured to send an instruction for obtaining an application to the hardware device;

the second receiving module is further configured to receive the instruction for obtaining an application from the computer;

the second sending module is further configured to return data to the computer;

the first receiving module is further configured to receive the data returned by the hardware device;

the second determining module is configured to determine whether the application is obtained successfully according to the data received by the first receiving module, and when the application is obtained successfully, trigger the first obtaining module, or when the application is obtained unsuccessfully, trigger the logon refusing module; and the logon refusing module is further configured to refuse logon when determining of the second determining result is that the application is obtained unsuccessfully.

Further, the first obtaining module specifically is configured to send an instruction for obtaining device identification to the hardware device, and to receive the device identification returned by the hardware device and store the device identification;

the second receiving module is further configured to receive the instruction for obtaining the device identification; and the second sending module is configured to return the device identification of the hardware device to the computer after the second receiving module receives the instruction for obtaining the device identification.

The computer further includes:

a splicing and encrypting module, configured to splice the second random number, the first random number, the first session random number to obtain a first spliced result, encrypt the first spliced result according to a preset algorithm to obtain the first encryption value using a first configuration service frame key stored and corresponding to the registration index; and the second verifying module is specifically configured to splice the third random number, the fourth random number and the second session random number in the first decrypted result obtained by the second decrypting module to obtain a second spliced result, to encrypt the second spliced result according to a preset algorithm to obtain a first encrypted result using the second configuration service frame key stored and corresponding to the registration index received by the second receiving module, and to determine whether the first encrypted result and the second encryption value in the first encrypted result received by the second receiving module are identical, when the first encrypted result and the second encryption value in the first encrypted result received by the second receiving module are identical, verifying is successful; when the first encrypted result and the second encryption value in the first encrypted result received by the second receiving module are not identical, verifying is failed.

Further, the first generating module is specifically configured to, when verifying of the second verifying module is successful, encrypt a third random number in the first decrypted result obtained by the second decrypting module according to the preset algorithm to obtain the third encryption value using the second device key corresponding to the registration index received by the second receiving module, and encrypt the second session random number in the first decrypted result obtained by the second decrypting module to obtain a fourth encryption value according to a preset algorithm using the second device key; and the first verifying module is specifically configured to: encrypt the first random number stored according to preset algorithm to obtain a fifth encryption value using the first device key stored and corresponding to the registration index, encrypt the first session random number stored according to a preset algorithm to obtain a sixth encryption value using the first device key, determine whether the fifth encryption value and the sixth encryption value matches the second decrypted result, when the fifth encryption value and the sixth encryption value matches the second decrypted result, verifying is successful and logon is permitted; when the fifth encryption value and the sixth encryption value does not match the second decrypted result, verifying is failed and logon is refused.

the computer further includes a third obtaining module, a third determining module and a deleting confirming module;

the first receiving module is further configured to receive deleting information selected by a user in a logout process;

the third obtaining module is configured to obtain a registration table after the first receiving module receives the deleting information;

the third determining module is configured to determine whether the deleting information received by the first receiving module matches the information in the registration table obtained by the third obtaining module, and when the deleting information received by the first receiving module does not match the information in the registration table obtained by the third obtaining module, to refuse logout; and the deleting confirming module is configured to prompt the user to confirm deleting information when determining result of the third determining module is that the deleting information received by the first receiving module matches the information in the registration table obtained by the third obtaining module, and to delete the information corresponding to the deleting information selected by the user from the registration table when information for confirming deleting is received from the user.

Further, the computer further includes a first initializing module, a fourth obtaining module, a fifth obtaining module, a fourth determining module, a negotiating and storing module, a third decrypting module and a first storing module;

the first receiving module is configured to receive triggering information for registration in a registration process and to receive the registration index and a third encrypted result which are sent by the hardware device;

the first initializing module is configured to initialize and start monitoring the hardware device when the first receiving module receives the triggering information for registration;

the fourth obtaining module is configured to obtain the device identification of the hardware device when the first initializing module monitors an insertion of the hardware device;

the fifth obtaining module is configured to obtain a registration table in the registration process;

the fourth determining module is configured to determine whether the device identification obtained by the fourth obtaining module matches the device identification in the registration table obtained, when the device identification obtained by the fourth obtaining module matches the device identification in the registration table obtained, to prompt that the current hardware device has been registered already;

the negotiating and storing module is configured to negotiate the encryption key with the hardware device and store the encryption key, when the fourth determining module determines that the device identification obtained by the fourth obtaining module does not match the device identification in the registration table obtained;

the first sending module is further configured to send the registration instruction to the hardware device in the registration process;

the first storing module is configured to store the registration index received by the first receiving module in the registration process;

the third decrypting module is configured to decrypt the third encrypted result received by the first receiving module using the first encryption key stored; and the first storing module is further configured to store the device identification obtained by the fourth obtaining module, the first device key and the first configuration service frame service key obtained from the third encrypted result by decrypting by the third decrypting module in the registration table obtained by the fifth obtaining module in correspondence to the registration index; and wherein the hardware device further comprises: an updating module, a generating and storing module and a third encrypting module;

the second receiving module is further configured to receive an instruction for registration sent by the computer in the registration process;

the updating module is configured to update the registration index after the second receiving module receives the instruction for registration;

the generating and storing module is configured to generate the second device key and the second configuration service frame key and store the second device key and the second configuration service frame key in correspondence to the registration index, the third encrypting module is configured to encrypt the second device key and the second configuration service frame key which are generated by the generating and storing module to obtain a third encrypted result using the second encryption key stored; and the second sending module is further configured to send the third encrypted result obtained by the third encrypting module and the registration index updated by the updating module to the computer.

Further, the computer further includes a fifth determining module;

the first sending module is further configured to send an instruction for obtaining an application to the hardware device in the registration process;

the second receiving module is further configured to receive the instruction for obtaining an application sent by the computer in the registration process;

the second sending module is further configured to return data to the computer after the second receiving module receives the instruction for obtaining an application;

the first receiving module is further configured to receive data returned by the hardware device in the registration process; and the fifth determining module is configured to determine whether the application is obtained successfully according to the data received by the first receiving module, when the application is obtained successfully, to trigger the fourth obtaining module, and when the application is obtained unsuccessfully, to prompt that registration is failed.

Further, the fourth obtaining module is specifically configured to send an instruction for obtaining device identification to the hardware device in the registration process, and to receive and store the device identification returned by the hardware device;

the second receiving module is further configured to receive the instruction for obtaining device identification in the registration process; and the second sending module is further configured to return the device identification to the computer after the second receiving module receives the instruction for obtaining device identification.

Further, the computer further includes: a prompting and receiving module, and a second storing module;

the prompting and receiving module is configured to prompt the user to input a user registration name in the registration process, and to receive the user registration name input by the user; and the second storing module is configured to store the user registration name received by the prompting and receiving module.

Further, the negotiating and storing module includes:

a first generating and storing unit, configured to generate a first key and store the first key;

a first encrypting unit, configured to encrypt a first preset data according to a preset algorithm to obtain a fifth encrypted result using the first key in the first generating and storing unit;

a first sending unit, configured to send the first key in the first generating and storing unit and the fifth encrypted result obtained by the first encrypting unit to the hardware device;

a first receiving unit, configured to receive the data sent by the hardware device;

a second obtaining unit, configured to obtain a second key and a sixth encrypted result from the data received by the first receiving unit;

a decrypting and determining unit, configured to decrypt the sixth encrypted result obtained by the second obtaining unit using the second key obtained by the second obtaining unit, determine whether the decrypted result is the first preset data, and when the decrypted result is not the first preset data, prompt that registration is failed; and the second generating and storing unit, configured to generate the first encryption key according to the first key stored by the first generating and storing unit and the second key obtained by the second obtaining unit when determining result of the decrypting and determining unit is that the decrypted result is the first preset data; and wherein the hardware device further comprises: an obtaining and determining module and a generating and encrypting module;

the second receiving module further is configured to receive the data sent by the computer in the negotiating key process;

the obtaining and determining module is configured to obtain the first key and the fifth encrypted result from the data received by the second receiving module, to decrypt the fifth encrypted result using the first key and determine whether a decrypted result is the first preset data;

the generating and encrypting module is configured to generate a second key when the determining result of the obtaining and determining module is that the decrypted result is the first preset data, generate the second encryption key according to the first key and the second key and store the second encryption key, and encrypt the decrypted result obtained by the obtaining and determining module according to a preset algorithm to obtain a sixth encrypted result using the second key; and the second sending module is further configured to send the second encryption key generated by the generating and encrypting module and the sixth encrypted result obtained by the generating and encrypting module to the computer, and is further configured to return error information to the computer when the determining result of the obtaining and determining module is that the decrypted result is not the first preset data.

Further, the generating and encrypting module is specifically configured to generate the second key when the determining result of the obtaining and determining module is that the decrypted result is the first preset data, to splice first eighth bytes of the first key and last eight bytes of the second key to obtain and store a second encryption key, and to encrypt the decrypted result according to the preset algorithm to obtain the sixth encrypted result using the second key; and the second generating and storing unit is specifically configured to splice the first eight bytes of the first key stored and the last eight bytes of the second key obtained by the second obtaining unit to obtain and store the first encryption key.

Further, the computer further includes:

a popping and prompting module, configured to pop up a box for verifying PIN code in the registration process, prompt the user to input a PIN code, and receive the PIN code; and a sixth determining module, configured to determine whether the PIN code input by the user and received by the popping and prompting module is identical to the PIN code stored, when the PIN code input by the user is identical to the PIN code stored, trigger the first storing module, and when the PIN code input by the user is not identical to the PIN code stored, prompt that the registration is failed.

Compared with the prior art, the present disclosure has the following advantages:

by cooperating a Windows system service application of a computer with a hardware device, it may achieve an aim to log on to Windows system with version 10 or higher directly by using a hardware device registered, which improves security in a logon process. In addition, since there is no limit for a type of the hardware device, any device that can perform security computing can be used to log on, hence it is user-friendly.

DESCRIPTION OF EMBODIMENTS

The technical solutions of the embodiments of the disclosure are described clearly and completely in conjunction with the accompanying drawings as follows. Apparently, the described drawings are merely a part of but not all of the embodiments according to the disclosure. Based on the described embodiments of the disclosure, other embodiments obtained by those of ordinary skill in the art without any creative effort would fall within the scope of the disclosure.

Embodiment I

Figure 1:
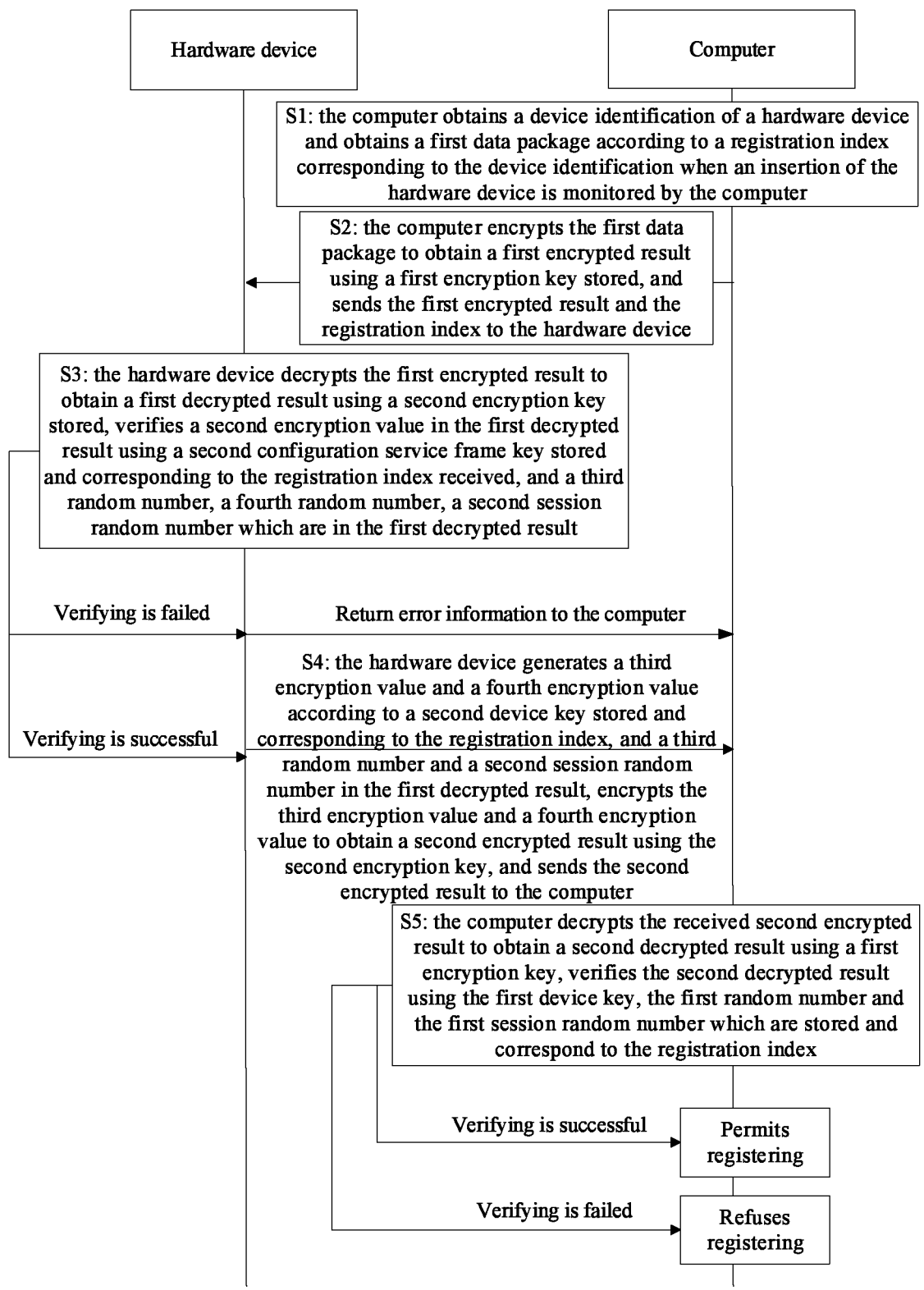
FIG. 1 is a flow chart for a method for implementing logging-on of hardware to windows system with version 10 or higher provided by Embodiment I of the present disclosure.

Embodiment I of the present disclosure provides a method for implementing logging-on of hardware to windows system with version 10 or higher. The system of a computer is Windows system with version 10 or higher. The method of the present embodiment includes an authentication process, as shown in FIG. 1, the authentication process includes:

Step S1, the computer obtains a device identification of a hardware device and obtains a first data package according to a registration index corresponding to the device identification when an insertion of the hardware device is monitored by the computer.

Specifically, the first data package in the present embodiment includes: a first random number, a second random number, a first session random number and a first encryption value.

Specifically, in the present embodiment, between the obtaining the device identification of the hardware device and the obtaining the first data package according to the corresponding device identification, the method includes: the computer determines whether the hardware device has been registered, when the hardware device has been registered, obtains the first data package according to the registration index corresponding to the device identification, and when the hardware device has not been registered, refuses the hardware to log on.

In which, that the computer determines whether the hardware device has been registered includes: the computer obtains a registration table and determines whether the device identification obtained and the device identification in the registration table are matched, when the device identification obtained and the device identification in the registration table are matched, determines that the hardware device has been registered, and when the device identification obtained and the device identification in the registration table are not matched, determines that the hardware device has not registered.

In the present embodiment, that the computer obtains the registration table includes: the computer invokes a first interface to obtain the registration table.

In which, in Step S1, before obtaining the device identification of the hardware device, the method further includes: the computer sends an instruction for obtaining an application to the hardware device; the hardware device returns data to the computer after receiving the instruction for obtaining an application; the computer receives the data returned by the hardware device, determines whether the application is obtained successfully according to the data received, when the application is obtained successfully, obtains the device identification of the hardware device, and when the application is obtained unsuccessfully, reports an error.

In which, the obtaining the device identification of the hardware device in Step S1 includes: the computer sends an instruction for obtaining device identification to the hardware device; the hardware device receives the instruction for obtaining device identification and sends the device identification of the hardware device back to the computer; and the computer receives and stores the device identification sent by the hardware device.

In the present embodiment, the obtaining the first data package according to the registration index corresponding to the device identification includes: the computer invokes a fourth interface to obtain the first data package according to the registration index corresponding to the device identification.

In which, before the obtaining the first data package according to the registration index corresponding to the device identification, the method includes: the computer splices the second random number, the first random number and the first session random number to obtain a first spliced result, encrypts the first spliced result according to a preset algorithm to obtain a first encryption value using a first configured service frame key stored and corresponding to the registration index.

Step S2, the computer encrypts the first data package to obtain a first encrypted result using a first encryption key stored, and sends the first encrypted result and the registration index to the hardware device.

Step S3, the hardware device decrypts the first encrypted result to obtain a first decrypted result using a second encryption key stored, verifies a second encryption value in the first decrypted result using a second configuration service frame key stored and corresponding to the registration index received, and a third random number, a fourth random number, a second session random number which are in the first decrypted result, when the verifying is successful, executes Step S4, and when the verifying is failed, returns error information to the computer.

In the present embodiment, in Step S3, that the hardware device verifies a second encryption value in the first decrypted result using a second configuration service frame key stored and corresponding to the registration index received, and a third random number, a fourth random number, a second session random number which are in the first decrypted result includes: the hardware device splices the third random number, the fourth random number and the second session random number in the first decrypted result to obtain a second spliced result, encrypts the second spliced result to obtain the first encrypted result according to a preset algorithm using the second configuration service frame key stored and corresponding to the registration index received, determines whether the first encrypted result and the second encryption value in the first decrypted result are identical, when the first encrypted result and the second encryption value in the first decrypted result are identical, verifies successfully, and when the first encrypted result and the second encryption value in the first decrypted result are not identical, verifies failed.

In the present embodiment, the computer refuses to log on after receiving error information returned by the hardware device.

Step S4, the hardware device generates a third encryption value and a fourth encryption value according to a second device key stored and corresponding to the registration index, and a third random number and a second session random number in the first decrypted result, encrypts the third encryption value and a fourth encryption value to obtain a second encrypted result using the second encryption key, and sends the second encrypted result to the computer.

Specifically, in the present embodiment, that the hardware device generates a third encryption value and a fourth encryption value according to the second device key stored and corresponding to the registration index, and a third random number and a second session random number in the first decrypted result, includes: the hardware device encrypts the third random number in the first decrypted result to obtain the third encryption value using a second device key corresponding to the registration index according to a preset algorithm; and encrypts the second session random number in the first decrypted result according to a preset algorithm to obtain a fourth encryption value using the second device key.

Step S5, the computer decrypts the received second encrypted result to obtain a second decrypted result using a first encryption key, verifies the second decrypted result using the first device key, the first random number and the first session random number which are stored and correspond to the registration index, when the verifying is successful, permits the registering, and when the verifying is failed, refuses the registering.

Specifically, in the present embodiment, that the computer verifies the second decrypted result using the first device key, the first random number and the first session random number which are stored and correspond to the registration index includes: the computer encrypts the first random number stored according to a preset algorithm to obtain a fifth encryption value using the first device key stored and corresponding to the registration index, encrypts the first session random number stored according to a preset algorithm to obtain a sixth encryption value using the first device key, determines whether the fifth encryption value and the sixth encryption value match the second decrypted result, when the fifth encryption value and the sixth encryption value match the second decrypted result (the verifying is successful), permits to log on; and when the fifth encryption value and the sixth encryption value do not match the second decrypted result (the verifying is failed), refuses logon.

In the present embodiment, the method further includes a log out process, and specifically, the log out process includes:

Step P1, the computer obtains a registering table after receiving deleting information selected by a user;

Step P2, the computer determines whether the deleting information received matches information in the registering table, when the deleting information received matches information in the registering table, executes Step P3, and when the deleting information received does not match information in the registering table, refuses logout; and Step P3, the computer prompts the user to confirm deleting operation, deletes information corresponding the deleting information selected by the user from the registration table after receiving that the user has confirmed deleting information, and ends the logout process.

The method of the present embodiment further includes a registration process, and specifically, the registration process includes:

Step A1, the computer initializes and starts monitoring hardware device after receiving triggering information for registration.

In the present embodiment, the initializing includes: the computer creates monitoring for searching device according to information of the hardware device. For example, the information of the hardware device may be PID (i.e. product identification) or VID (i.e. vendor identification) and etc.

Specifically, before Step A1, the method includes:

Step P1, the computer invokes a first interface to obtain a registering table when an application in the computer is invoked; and Step P2, the computer displays the registering table obtained.

Step A2, the computer obtains the device identification of the hardware device and the registering table, after an insertion of the hardware device is monitored.

In the present embodiment, before obtaining the device identification of the hardware device in Step A2, the method further includes: the computer sends an instruction for obtaining an application to the hardware device; the hardware device returns data to the computer after receiving the instruction for obtaining an application; the computer receives the data returned, determines whether the application is obtained successfully according to the data received, when the application is obtained successfully, obtains the device identification of the hardware device, and when the application is obtained unsuccessfully, reports an error.

Specifically, the obtaining the device identification of the hardware device in Step A2 includes: the computer sends the instruction for obtaining device identification to the hardware device; the hardware device receives the instruction for obtaining device identification and returns the device identification of the hardware device to the computer; and the computer receives and stores the device identification returned by the hardware device.

Optionally, the obtaining the registration table in Step A2 includes: the computer invokes the first interface to obtain the registration table.

Step A3, the computer determines whether the device identification obtained matches the device identification in the registration table, when the device identification obtained matches the device identification in the registration table, prompts that the current hardware device has been registered and ends the registration process, and when the device identification obtained does not match the device identification in the registration table, executes Step A4.

Specifically, between Step A3 and Step A4, the method further includes: the computer prompts the user to input a user registration name, and stores the user registration name after receiving the user registration name input by the user.

Step A4, the computer negotiates an encryption key with the hardware device, and stores the encryption key.

Specifically, in the present embodiment, Step A4 includes:

Step A41, the computer generates and stores a first key, encrypts a preset data to obtain a fifth encrypted result using the first key, and sends the first key and the fifth encrypted result to the hardware device;

Step A42, the hardware device receives the first key and the fifth encrypted result which are sent by the computer, decrypts the fifth encrypted result using the first encryption key, determines whether a decrypted result is the first preset data, when the decrypted result is the first preset data, executes Step A43; and when the decrypted result is not the first preset data, returns information of error registration to the computer, and ends the procedure;

Step A43, the hardware device generates a second key, generates the second encryption key according to the first key and the second key, encrypts the decrypted result to obtain a sixth encrypted result using the second key, and sends the second key and the sixth encrypted result to the computer.

preferably, the generating the second encryption key according to the first key and the second key includes: splicing first eight bytes of the first key and last eight bytes of the second key to obtain the second encryption key;

Step A44, the computer receives the second key and the sixth encrypted result which are sent by the hardware device, decrypts the sixth encrypted result using the second key, determines whether the decrypted result is the first preset data, when the decrypted result is the first preset data, executes Step A45, and when the decrypted result is not the first preset data, prompts that the registration is failed, and ends the procedure; and Step A45, the computer generates and stores the first encryption key according to the first key stored and the second key obtained;

Specifically, Step A45 includes: the computer splices the first eight bytes of the first key and the last eight bytes of the second key to obtain and store the first encryption key.

Step A5, the computer sends an instruction for registration to the hardware device;

Step A6, the hardware device receives the instruction for registration, updates the registration index, generates the second device key and the second configuration service frame key, and stores the second device key and the second configuration service frame key in correspondence to the registration index;

Step A7, the hardware device sends the third encrypted result and the registration index to the computer;

Step A8, the computer stores the registration index received and decrypts the third encrypted result received using the first encryption key stored; and Step A9, the computer stores the device identification, the first device key obtained by decrypting the third encrypted result and the first configuration service frame key in the registration table in correspondence to the registration index.

In the present embodiment, before Step A9, the method includes;

Step B1, the computer pops up a box for verifying PIN code and prompts the user to input a PIN code; and Step B2, the computer receives the PIN code input by the user, determines whether the PIN code input by the user is identical to the PIN code stored, when the PIN code input by the user is identical to the PIN code stored, executes Step A9, and when the PIN code input by the user is not identical to the PIN code stored, reports an error.

Embodiment II

Figure 2:
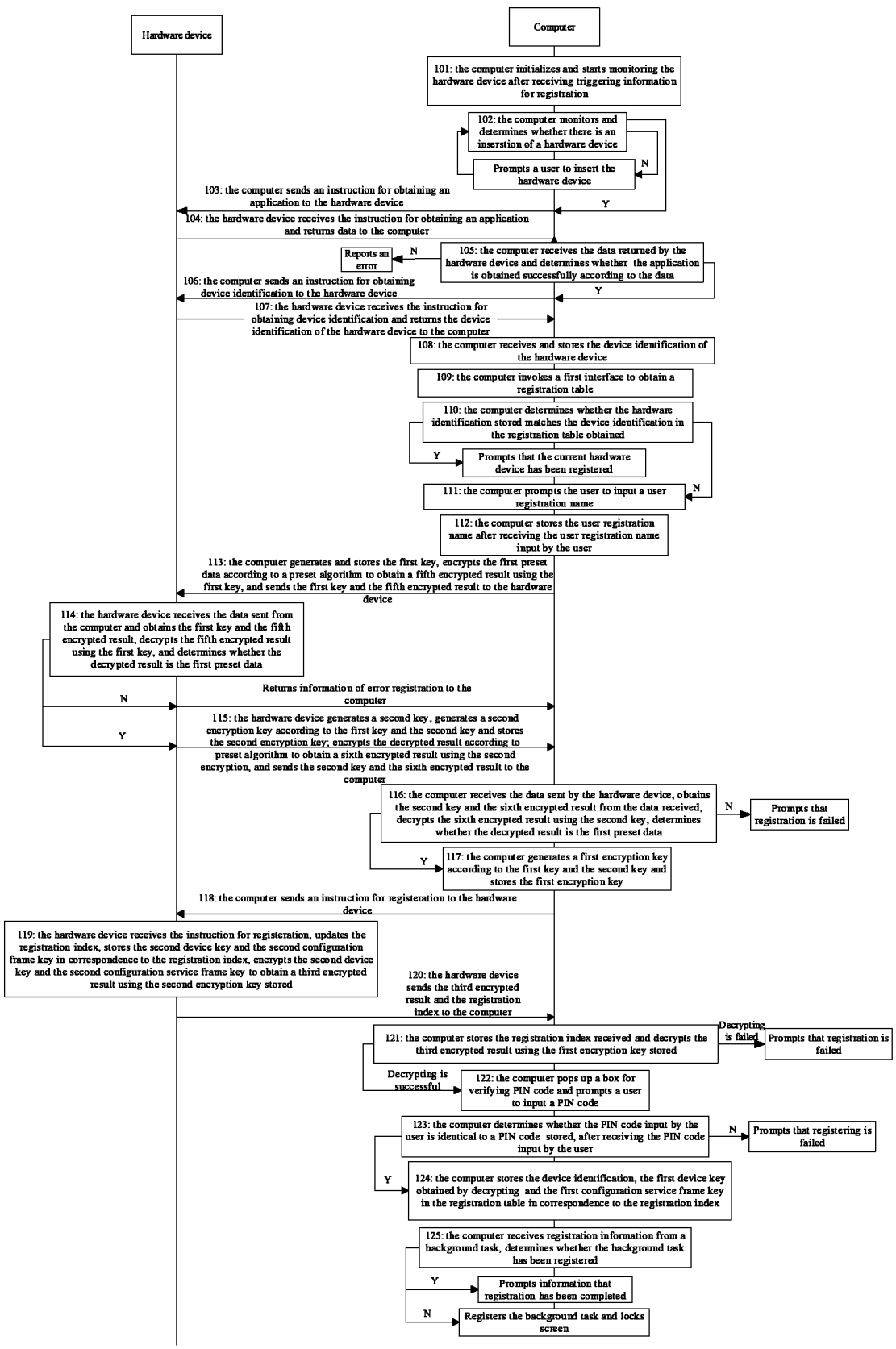
FIG. 2 is a flow chart for a registration process of a method for implementing logging-on of hardware to windows system with version 10 or higher provided by Embodiment II of the present disclosure.

Embodiment II of the present disclosure provides a method for implementing logging-on of hardware to windows system with version 10 or higher. The system of a computer is windows system with version 10 or higher. The method of the present embodiment includes a registration process and an authentication process, as shown in FIG. 2, the authentication process includes:

Step 101, the computer initializes and starts monitoring the hardware device after receiving triggering information for registration.

Specifically, in the present embodiment, initializing includes: the computer creates monitoring for searching device according to information of the hardware device;

Preferably, before Step 101, the method further includes:

Step a1, when an application of the computer is initiated, the computer invokes a first interface to obtain a registration table.

Specifically, in the present embodiment, the first interface is FindAllRegisteredDeviceInfoAsync, and the registration table includes the device identification, the first device key and the first configuration service frame key, and the registration index.

Step a2, the computer displays the registration table obtained.

Step 102, the computer monitors and determines whether there is an insertion of a hardware device, when there is an insertion of a hardware device, executes Step 103; and when there is not an insertion of a hardware device, prompts a user to insert the hardware device, and goes back to Step 102.

Step 103, the computer sends an instruction for obtaining an application to the hardware device.

For example, the instruction for obtaining an application in the present embodiment is 00 a4 04 00 0e d1 56 00 01 32 52 68 65 6c 6c 6f 01 01 00.

Step 104, the hardware device receives the instruction for obtaining an application and returns data to the computer.

Step 105, the computer receives the data returned by the hardware device and determines whether the application is obtained successfully according to the data, when the application is obtained successfully, executes Step 106; and when the application is obtained unsuccessfully, reports an error.

In the present embodiment, the determining whether the application is obtained successfully according to the data in Step 105 includes:

the computer determines whether the data received is a first preset value, when the data received is the first preset value, the application is obtained successfully; and when the data received is the first preset value, the application is obtained unsuccessfully. For example, the first preset value in the present embodiment is 9000.

For example, the reporting the error in the present embodiment specifically is that the computer displays an interface of failure.

Step 106, the computer sends an instruction for obtaining device identification to the hardware device.

For example, the instruction for obtaining device identification in the present embodiment is: 00 27 00 00 00.

Step 107, the hardware device receives the instruction for obtaining device identification and returns the device identification of the hardware device to the computer.

For example, in the present embodiment, the device identification is: 5a e8 51 1b 83 90 2a 34 48 ce d1 75 c6 1a 30 b9 9d b1 51 c7 c5 e2 b7 78 14 f7 0d 96 7f 6f e6 8c.

Step 108, the computer receives and stores the device identification of the hardware device.

Step 109, the computer invokes a first interface to obtain a registration table.

Specifically, in the present embodiment, the first interface is FindAllRegisteredDeviceInfoAsync.

Step 110, the computer determines whether the device identification stored matches the device identification in the registration table obtained, when the device identification stored matches the device identification in the registration table obtained, prompts that the current hardware device has been registered; and when the device identification stored does not match the device identification in the registration table obtained, executes Step 111.

Step 111, the computer prompts the user to input a user registration name.

Step 112, the computer stores the user registration name after receiving the user registration name input by the user.

For example, in the present embodiment, the user registration name is: A_EPASS_key.

Step 113, the computer generates and stores the first key, encrypts the first preset data according to a preset algorithm to obtain a fifth encrypted result using the first key, and sends the first key and the fifth encrypted result to the hardware device.

Preferably, in the present embodiment, the first key is a random number whose length is 16 bytes, and the length of the fifth encrypted result is 16 bytes. For example, the first key is: 1e e1 86 9a 87 0c 1d d0 1b 80 9b bd d8 d6 83 be, the first preset data is: EnterSafe—Hello; and the fifth encrypted result is: f9 12 16 0c db 71 94 a3 c8 dd 10 bd ad ff 51 ec.

Step 114, the hardware device receives the data sent from the computer and obtains the first key and the fifth encrypted result, decrypts the fifth encrypted result using the first key, determines whether the decrypted result is the first preset data, when the decrypted result is the first preset data, executes Step 115; and when the decrypted result is not the first preset data, returns information of error registration to the computer.

Preferably, in the present embodiment, the computer receives information of error registration and prompts that the registration is failed.

Step 115, the hardware device generates a second key, generates a second encryption key according to the first key and the second key and stores the second encryption key; encrypts the decrypted result according to preset algorithm to obtain a sixth encrypted result using the second encryption, and sends the second key and the sixth encrypted result to the computer.

Specifically, in the present embodiment, the generating a second encryption key according to the first key and the second key, includes: splicing first eight bytes of the first key and last eight bytes of the second key to obtain the second encryption key. For example, the second encryption key is: 0a c8 6e 9c 30 b5 e5 d5 c1 32 86 fb 30 41 bf e4; and the sixth encrypted result is: 48 57 d9 96 6c d2 74 46 43 f7 a2 90 fa 91 b6 26.

Step 116, the computer receives the data sent by the hardware device, obtains the second key and the sixth encrypted result from the data received, decrypts the sixth encrypted result using the second key, determines whether the decrypted result is the first preset data, when the decrypted result is the first preset data, executes Step 117, and when the decrypted result is not the first preset data, prompts that registration is failed.

Step 117, the computer generates a first encryption key according to the first key and the second key and stores the first encryption key.

Specifically, the implementing process in the present embodiment is similar to the generating process of Step 115, and details will not be repeated herein.

Step 118, the computer sends an instruction for registration to the hardware device.

For example, in the present embodiment, the instruction for registration is: 00 20 00 00 00.

Step 119, the hardware device receives the instruction for registration, updates the registration index, stores the second device key and the second configuration frame key in correspondence to the registration index, encrypts the second device key and the second configuration service frame key to obtain a third encrypted result using the second encryption key stored.

Specifically, in the present embodiment, the updating the registration index is: adding the registration index itself by one. For example, the device key is: 24 49 94 23 06 8e b2 00 80 27 22 33 12 49 35 6b 9c 00 26 59 95 26 e3 d3 fe c0 63 a8 22 c0 65 0a; the server key is: d2 06 28 ad bb ab 27 22 d1 e6 3c 04 a4 39 68 ca 57 12 e3 3f e0 b6 44 59 d7 a8 50 0b 0a 0a 3d 2d; and the third encrypted result is: cc 01 a8 8b 01 a9 fa ec 44 51 9f fc c5 44 be 4d e5 02 d1 f9 31 3d fa 35 69 3f 2c 2a be a1 ec a3 13 db 39 8c b6 02 d6 00 59 46 18 4b db 82 67 ad 97 ce c5 ea 79 41 38 e6 e4 b2 94 82 00 40. The hardware device registers in different systems corresponding to different registration indexes.

Step 120, the hardware device sends the third encrypted result and the registration index to the computer.

Step 121, the computer stores the registration index received and decrypts the third encrypted result using the first encryption key stored, when the decrypting is successful, executes Step 122, and when the decrypting is failed, prompts that registration is failed.

Step 122, the computer pops up a box for verifying PIN code and prompts a user to input a PIN code.

Step 123, the computer determines whether the PIN code input by the user is identical to a PIN code stored, after receiving the PIN code input by the user, when the PIN code input by the user is identical to the PIN code stored, executes Step 124, and when the PIN code input by the user is not identical to the PIN code stored, prompts that registration is failed.

For example, in the present embodiment, the PIN code is: ABC123456.

Step 124, the computer stores the device identification, the first device key obtained by decrypting the third encrypted result and the first configuration service frame key in the registration table in correspondence to the registration index.

Step 125, the computer receives registration information from a background task, determines whether the background task has been registered, when the background task has been registered, prompts information that registration has been completed, and when the background task has not been registered, registers the background task and locks screen.

Specifically, in the present embodiment, the computer registers the background task via both a class of BackgroundExecutionManager and a class of BackgroundTaskBuilder, and creates a trigger event for the background task, i.e., triggers the background task via an event, which is mainly implemented by a class of SecondaryAuthenticationFactor-AuthenticationTrigger. In this embodiment, when a user locks screen, the background task is triggered and the authentication process is started.

Figure 3:
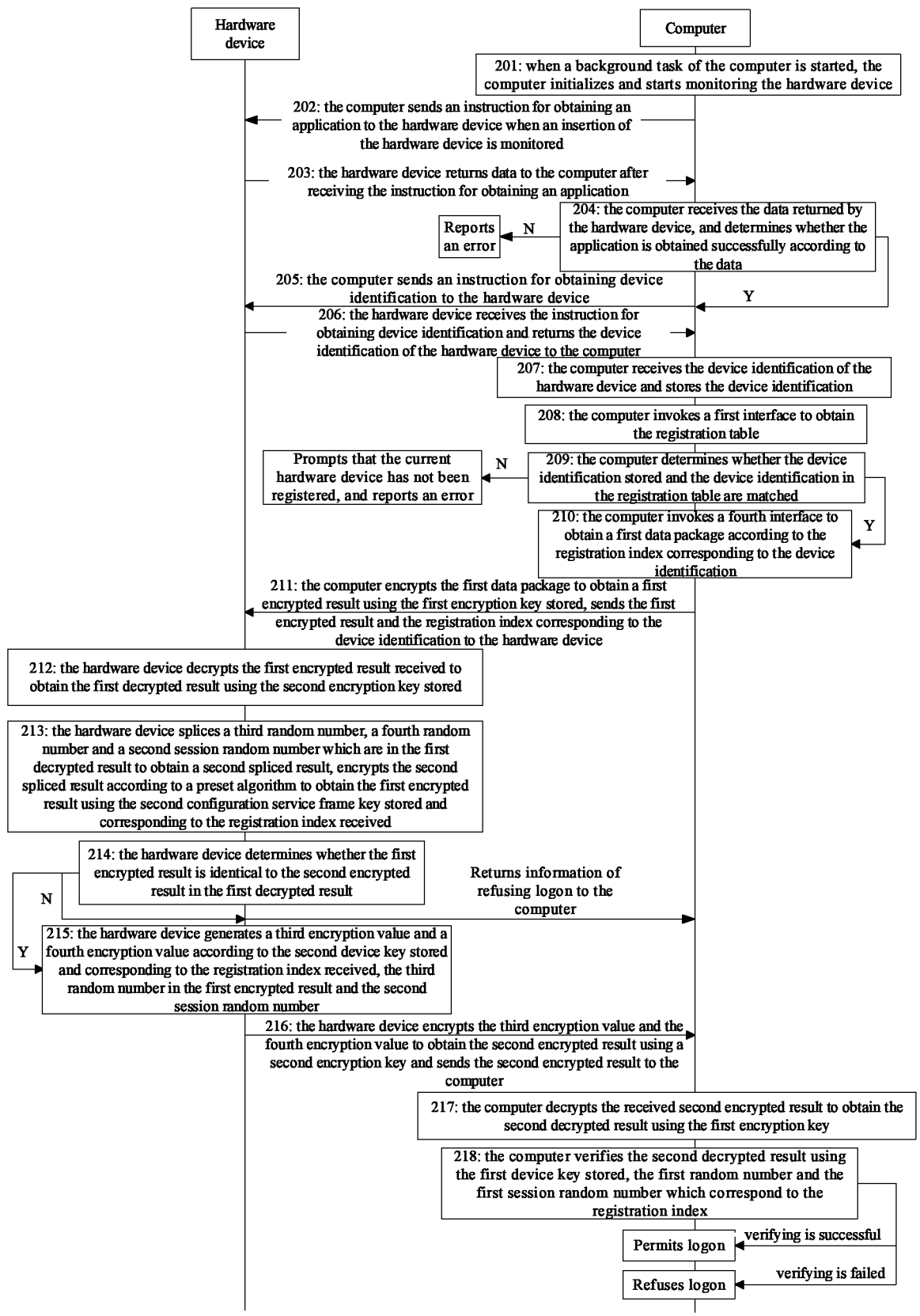
FIG. 3 is a flow chart for an authentication process of a method for implementing logging-on of hardware to windows system with version 10 or higher provided by Embodiment II of the present disclosure.

As shown in FIG. 3, the authentication process in the present method includes:

Step 201, when a background task of the computer is started, the computer initializes and starts monitoring the hardware device.

Specifically, in the present embodiment, that the computer initializes includes that the computer creates monitoring for searching device according to information of the hardware device.

Step 202, the computer sends an instruction for obtaining an application to the hardware device when an insertion of the hardware device is monitored.

Step 203, the hardware device returns data to the computer after receiving the instruction for obtaining an application.

Step 204, the computer receives the data returned by the hardware device, determines whether the application is obtained successfully according to the data, when the application is obtained successfully, executes Step 205; and when the application is not obtained successfully, reports an error.

In the present embodiment, Step 204 includes that the computer determines whether the data received is a first preset value, when the data received is a first preset value, determines that the application is obtained successfully, and when the data received is not the first preset value, determines that the application is obtained unsuccessfully. For example, the first preset value in the present embodiment is 9000.

Step 205, the computer sends an instruction for obtaining device identification to the hardware device.

Step 206, the hardware device receives the instruction for obtaining device identification and returns the device identification of the hardware device to the computer.

Step 207, the computer receives the device identification of the hardware device and stores the device identification.

Step 208, the computer invokes a first interface to obtain the registration table.

Specifically, in the present embodiment, the first interface is FindAllRegisteredDeviceInfoAsync, and the registration table includes the device identification, the first device key, the first configuration service frame key and the registration index.

Step 209, the computer determines whether the device identification stored and the device identification in the registration table are matched, when the device identification stored and the device identification in the registration table are matched, executes Step 210, and when the device identification stored and the device identification in the registration table are not matched, prompts that the current hardware device has not been registered, and reports an error.

Step 210, the computer invokes a fourth interface to obtain a first data package according to the registration index corresponding to the device identification.

Specifically, the fourth interface in the present embodiment is function StartAuthenticationAsync, and the first data includes: a second random number, a first random number, a first session random number and a first encryption value.

Before Step 210, the method further includes: the computer splices the second random number, the first random number, the first session random number to obtain a first spliced result, encrypts the first spliced result according to a preset algorithm to obtain a first encryption value using the first configuration service frame key stored and corresponding to the registration index.

For example, the second random number in the present embodiment is: 95 c1 6d 5b 1c f6 80 40 ac 49 31 52 92 cf 7d cc 94 11 2d 0e 59 74 31 a6 ea 81 e1 c0 82 5a d7 26; the first random number is: bb 17 71 28 25 9f 77 fb c0 5c 29 99 fd 15 2d 20 4d ee ee 7a 0d ed 96 6c 8b b8 63 e7 c8 cc d1 92; the first session random number is: 9d 26 5b 0c 69 7c 3b b3 b5 f5 96 5e 3f 19 bf 6d 66 ff c9 50 51 d8 11 59 8a 8c 76 28 27 c7 1c dc; and the first encryption value is: e0 b1 88 c1 e2 91 40 68 45 76 0a 52 14 bc 8d 30 68 a6 74 11 f0 05 9c df a4 de 8f d4 f5 e9 a0 c7.

Step 211, the computer encrypts the first data package to obtain a first encrypted result using the first encryption key stored, sends the first encrypted result and the registration index corresponding to the device identification to the hardware device.

Specifically, in the present embodiment, the computer may generate the first encryption key in advance and stores the first encryption key, and the first encryption key and the second key in the registration process may be the same or different.

Step 212, the hardware device decrypts the first encrypted result received to obtain the first decrypted result using the second encryption key stored.

Step 213, the hardware device splices a third random number, a fourth random number and a second session random number which are in the first decrypted result to obtain a second spliced result, encrypts the second spliced result according to a preset algorithm to obtain the first encrypted result using the second configuration service frame key stored and corresponding to the registration index received.

Step 214, the hardware device determines whether the first encrypted result is identical to the second encrypted result in the first decrypted result, when the first encrypted result is identical to the second encrypted result in the first decrypted result, executes Step 215; and when the first encrypted result is not identical to the second encrypted result in the first decrypted result, returns information of refusing logon to the computer.

Step 215, the hardware device generates a third encryption value and a fourth encryption value according to the second device key stored and corresponding to the registration index received, the third random number in the first encrypted result and the second session random number.

Specifically, in the present embodiment, Step 215 includes: the hardware device encrypts the third random number in the first decrypted result according to a preset algorithm to obtain a third encryption value using the second device key, and encrypts the second session random number in the first decrypted result to obtain a fourth encryption value according to a preset algorithm using the second device key. For example, the third encryption value in the present embodiment is: 83 00 42 2c 5c 4a 95 3e 8c 21 fe 42 0f ed f0 ac 23 9c ac 72 82 d9 2e d3 27 b6 59 e3 64 35 7b ea; and the fourth encryption value is: bb 55 73 b3 fd 9b 08 7e 1f b4 84 b7 c7 0e 32 20 86 ce 4e ea 15 5c 27 62 5e 5e 1c b6 00 f6 35 1c e6 2c 1c 13.

Step 216, the hardware device encrypts the third encryption value and the fourth encryption value to obtain the second encrypted result using a second encryption key and sends the second encrypted result to the computer.

Step 217, the computer decrypts the received second encrypted result to obtain the second decrypted result using the first encryption key.

Step 218, the computer verifies the second decrypted result using the first device key stored, the first random number and the first session random number which correspond to the registration index, permits logon when the verifying is successful, and refuses logon when the verifying is failed.

In the present embodiment, Step 219 specifically includes: the computer encrypts the first random number stored to obtain a fifth encryption value using the first device key stored and corresponding to the registration index according to a preset algorithm, encrypts the first session random number stored according to a preset algorithm to obtain a sixth encryption value using the first device key, determines whether the fifth encryption value and a sixth encryption value match the second decrypted result, when the fifth encryption value and a sixth encryption value match the second decrypted result (verifying is successful), permits logon; and when the fifth encryption value and a sixth encryption value do not match the second decrypted result (verifying is failed), refuses logon.

Figure 4:
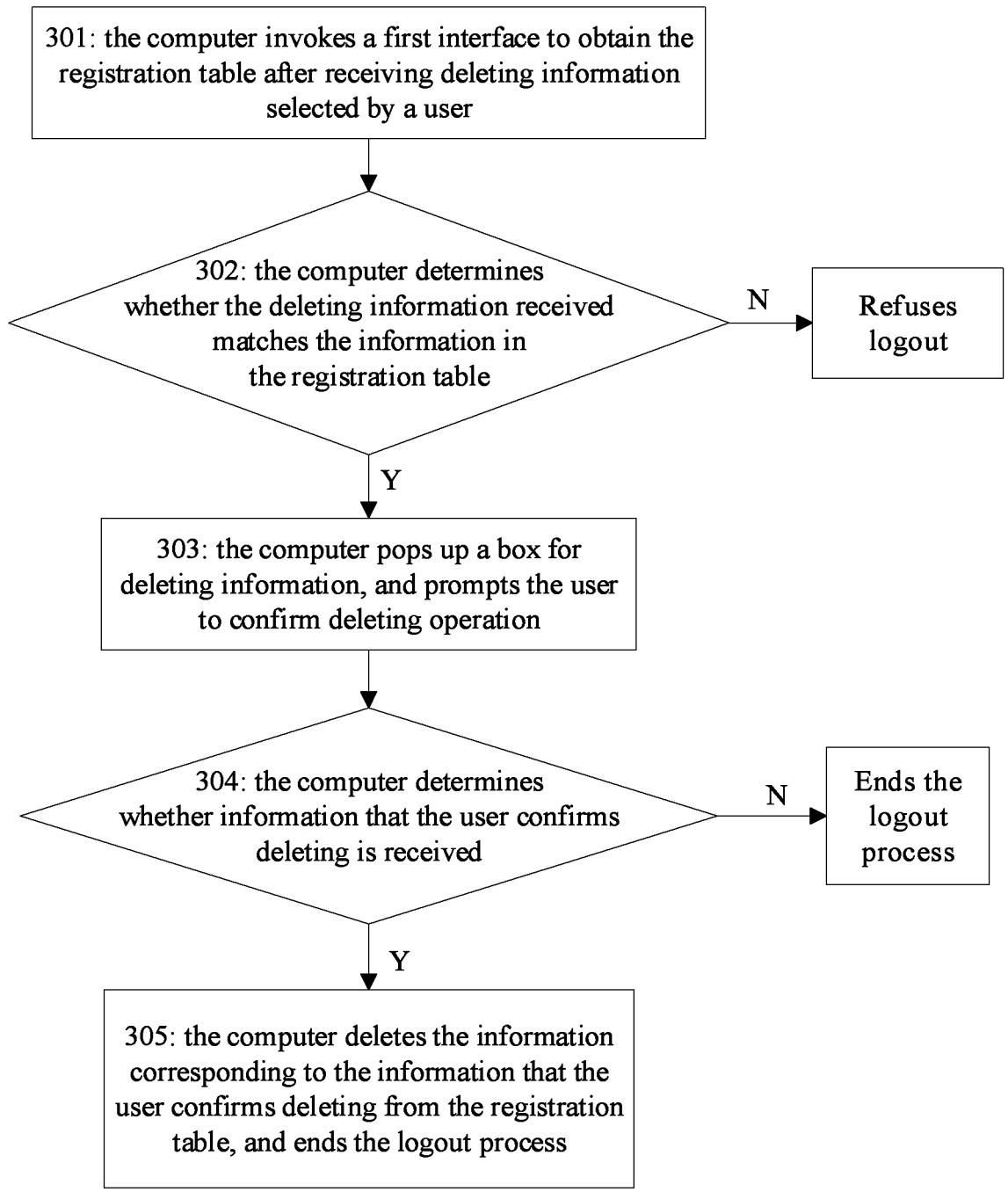
FIG. 4 is a flow chart for a logout process of a method for implementing logging-on of hardware to windows system with version 10 or higher provided by Embodiment II of the present disclosure.

As shown in FIG. 4, the method of the present embodiment may include a logout process, which includes:

Step 301, the computer invokes a first interface to obtain the registration table after receiving deleting information selected by a user.

Specifically, in the present embodiment, the first interface is: FindAllRegisteredDeviceInfoAsync.

Step 302, the computer determines whether the deleting information received matches the information in the registration table, when the deleting information received matches the information in the registration table, executes Step 303; and when the deleting information received does not match the information in the registration table, refuses logout.

Step 303, the computer pops up a box for deleting information, and prompts the user to confirm deleting operation.

Step 304, the computer determines whether information that the user confirms deleting is received, when the information that the user confirms deleting is received, executes Step 305; and when the information that the user confirms deleting is not received, ends the logout process.

Step 305, the computer deletes the information corresponding to the information that the user confirms deleting from the registration table, and ends the logout process.

Embodiment III

Figure 5:
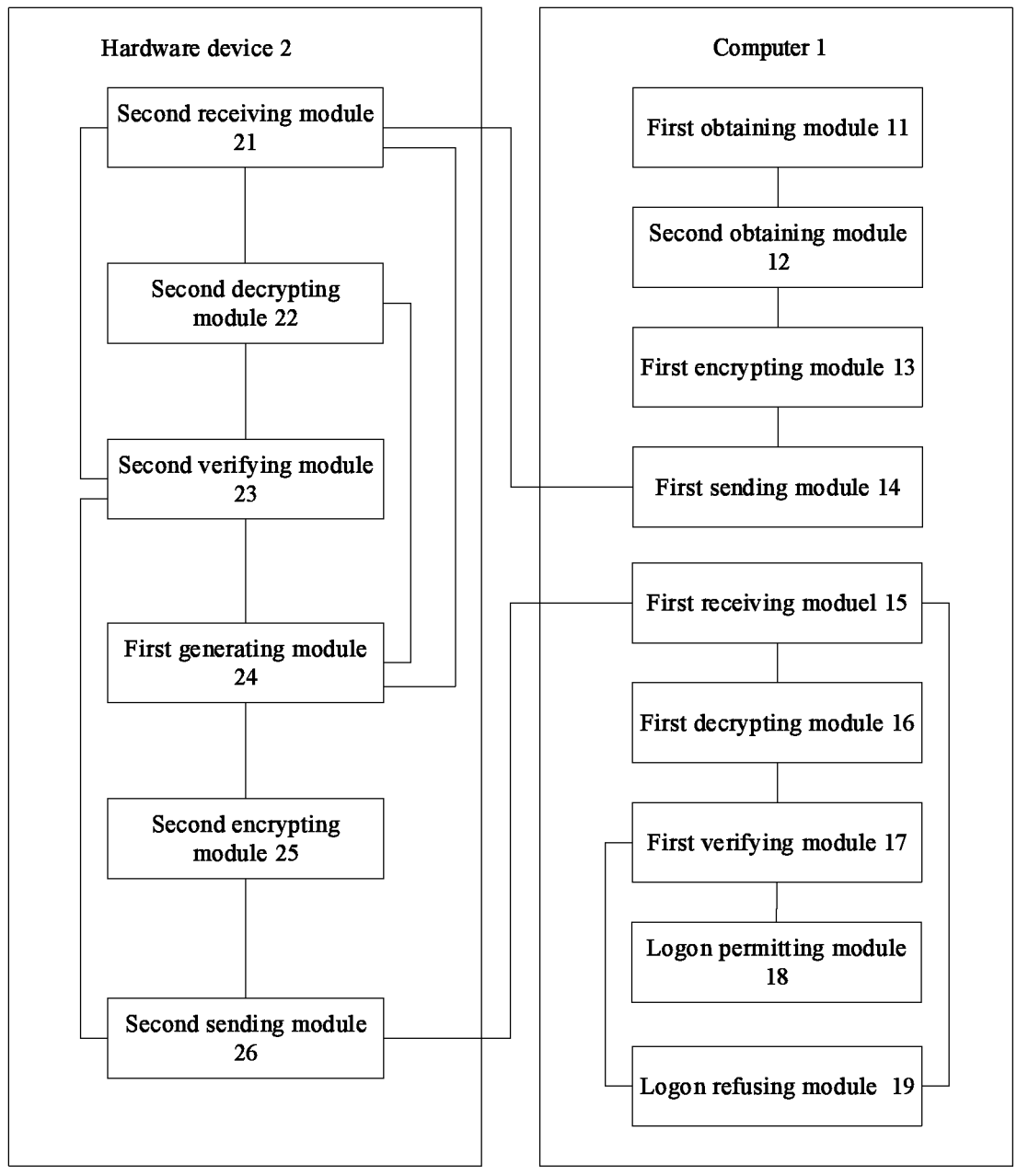
FIG. 5 is a block diagram of an apparatus for implementing logon of hardware on windows system with version 10 or higher provided by Embodiment III of the present disclosure.

Embodiment III provides an apparatus for implementing logging-on of a hardware to windows system with version 10 or higher. As shown in FIG. 5, the apparatus includes a computer 1 and a hardware device 2. In which, the system of computer 1 is window 10 system or higher system, and the computer 1 includes:

a first obtaining module 11, configured to obtain a device identification of the hardware device when the computer 1 monitors an insertion of the hardware device in an authentication process;

a second obtaining module 12, configured to obtain a first data package according to a registration index corresponding to the device identification obtained by the first obtaining module 11;

specifically, the first data package in the present embodiment includes: a first random number, a second random number, a first session random number and a first encryption value;

in the present embodiment, the second obtaining module 12 specifically is configured to invoke the fourth interface to obtain the first data package according to the registration index corresponding to the device identification and obtained by the first obtaining module 11;

a first encrypting module 13 is configured to encrypt the first data package obtained by the second obtaining module 12 to obtain a first encrypted result using the first encryption key stored;

a first sending module 14 is configured to send the registration index and the first encrypted result obtained by the first encrypting module 13 to the hardware device 2;

a first receiving module 15 is configured to receive a second encrypted result or error information sent by a second sending module 26 of the hardware device 2;

a first decrypting module 16 is configured to decrypt the second encrypted result received by the first receiving module 15 to obtain a second decrypted result using a first encryption key stored;

a first verifying module 17 is configured to verify the second decrypted result obtained by the first decrypting module 16 using a first device key stored and corresponding to the registration index, the first random number and the first session random number;

a logon permitting module 18 is configured to permit logon when the first verifying module 17 verifies successfully;

a logon refusing module 19 is configured to refuse logon when the first receiving module 15 receives an error or the first verifying module 17 verifies unsuccessfully;

the hardware device 2 includes:

a second receiving module 21 is configured to receive a first encrypted result and a registration index which are sent by the first sending module 14 of the computer 1;

a second decrypting module 22 is configured to decrypt the first encrypted result received by the second receiving module 21 to obtain a first decrypted result using the second encryption key;

a second verifying module 23 is configured to verify the second encryption value in the first decrypted result received by the second receiving module by using a second configuration service frame key corresponding to the registration index received by the second receiving module 21, and a third random number, a fourth random number and a second session random number which are in the first decrypted result;

a first generating module 24 is configured to, when the second verifying module 23 verifies successfully, generate a third encryption value and a fourth encryption value according to the second device key corresponding to the registration index received by the second receiving module 21, the third random number and the second session random number in the first decrypted result obtained by the second decrypting module 22;

a second encrypting module 25 is configured to encrypt the third encryption value and the fourth encryption value which are generated by the first generating module 24 to obtain a second encrypted result using the second encryption key;

a second sending module 26 is configured to, when the second verifying module 23 verifies unsuccessfully, return error information to the computer 1, and further is configured to send the second encrypted result obtained by the second encrypting module 25 to the computer 1.

Preferably, the computer 1 of the present embodiment further includes:

a first determining module, configured to determine whether the hardware device has been registered in an authentication process, when the hardware device has been registered in an authentication process, trigger the second obtaining module 12, and when the hardware device has not been registered in an authentication process, trigger the logon refusing module 19.

Specifically, the first determining module includes:

a first obtaining unit, configured to obtain a registration table;

in the present embodiment, the first obtaining module is specifically configured to invoke the first interface to obtain the registration table;

a first determining unit, configured to determine whether the device identification obtained by the first obtaining module 11 matches the device identification in the registration table obtained by the first obtaining unit, when the device identification obtained by the first obtaining module 11 matches the device identification in the registration table obtained by the first obtaining unit, determine that the hardware has been registered; and when the device identification obtained by the first obtaining module 11 does not match the device identification in the registration table obtained by the first obtaining unit, determine that the hardware has not been registered.

The logon refusing module 19 is further configured to, when a determining result of the first determining module is that the device identification obtained by the first obtaining module 11 does not match the device identification in the registration table obtained by the first obtaining unit, refuse logon.

Preferably, the computer 1 of the present embodiment further includes a second determining module;

the first sending module 14 further is configured to send an instruction for obtaining an application to the hardware device 2;

the second receiving module 21 further is configured to receive the instruction for obtaining an application sent by the computer 1;

the second sending module 26 is further configured to return data to the computer 1;

the first receiving module 15 is further configured to receive the data received from the hardware device 2;

the second determining module is configured to determine whether the application is obtained successfully according to the data received by the first receiving module 15, when the application is obtained successfully, trigger the first obtaining module 11; and when the application is obtained unsuccessfully, trigger the logon refusing module 19;

The logon refusing module 19 is further configured to refuse logon when determining result of the second determining module is that the application is obtained unsuccessfully.

In the present embodiment, the first obtaining module 11 is specifically configured to send an instruction for obtaining device identification to the hardware device 2; and receive the device identification returned by the hardware device 2 and stores the device identification.

The second receiving module 21 is further configured to obtain the instruction for obtaining the device identification;

the second sending module 26 is further configured to return the device identification to computer 2 after the second receiving module 21 receives the instruction for obtaining the device identification.

Preferably, the computer 1 further includes: a splicing and encrypting module, configured to splice the second random number, the first random number, the first session random number to obtain a first spliced result, and encrypt the first spliced result by using the first configuration service frame key stored and corresponding to the registration index to obtain a first encryption value.

Correspondingly, the second verifying module 23 is specifically configured to splice a third random number, a fourth random number and a second session random number in the first encrypted result obtained by the second decrypting module 22 to obtain a second spliced result, encrypt the second spliced result according to a preset algorithm to obtain the first encrypted result using the second configuration service frame key corresponding to the registration index and received by the second receiving module 21, determine whether the first encrypted result is identical to the second encryption value in the first decrypted result received by the second receiving module 21, when the first encrypted result is identical to the second encryption value, the verifying is successful; and when the first encrypted result is not identical to the second encryption value, the verifying is failed.

In the present embodiment, the first generating module 24 is specifically configured to, when the verifying result of the second verifying module 23 is successful, encrypt the third random number in the first encrypted result obtained by the second decrypting module 22 according to a preset algorithm to obtain a third encryption value using the second device key corresponding to the registration index and received by the second receiving module 21, and encrypt the second session random number in the first decrypted result obtained by the second decrypting module 22 according to a preset algorithm to obtain a fourth encryption value using the second device key.

Correspondingly, the first verifying module 17 is specifically configured to encrypt the first random number stored according to preset algorithm to obtain a fifth encryption value using the first device key stored and corresponding to the registration index, to encrypt the first session random number stored according to a preset algorithm to obtain a sixth encryption value; using the first device key, to determine whether the fifth encryption value and the sixth encryption value matches the second decrypted result, and when the fifth encryption value and the sixth encryption value matches the second decrypted result (verifying is successful), to permit logon, and when the fifth encryption value and the sixth encryption value does not match the second decrypted result (verifying is failed), to refuse logon.

Preferably, the computer 1 of the present embodiment further includes a third obtaining module, a third determining module and a deleting confirming module;

the first receiving module 15 is further configured to receive deleting information selected by a user in a logout process;

the third obtaining module is configured to obtain a registration table after the first receiving module 15 receives the deleting information;

the third determining module is configured to determine whether the deleting information received by the first receiving module 15 matches the information in the registration table obtained by the third obtaining module, and when the deleting information received by the first receiving module 15 does not match the information in the registration table obtained by the third obtaining module, to refuse logout;

the deleting confirming module is configured to prompt the user to confirm deleting information when determining result of the third determining module is that the deleting information received by the first receiving module 15 matches the information in the registration table obtained by the third obtaining module, delete information corresponding to the deleting information selected by the user from the registration table when information for confirming deleting is received from the user.

Preferably, the computer 1 of the present embodiment further includes a first initializing module, a fourth obtaining module, a fifth obtaining module, a fourth determining module, a negotiating and storing module, a third decrypting module and a first storing module;

the first receiving module 15 is configured to receive triggering information for registration received in a registration process, further to receive the registration index and a third encrypted result which are sent by the hardware device;

the first initializing module is configured to initialize and start monitoring the hardware device when the first receiving module 15 receives the triggering information for registration;

the fourth obtaining module is configured to obtain the device identification of the hardware device when the first initializing module monitors an insertion of the hardware device; and the fifth obtaining module is configured to obtain a registration table in the registration process.

In the present embodiment, the fifth obtaining module is specifically configured to invoke the first interface to obtain the registration table in the registration process.

The fourth determining module is configured to determine whether the device identification obtained by the fourth obtaining module matches the device identification in the registration table obtained, when the device identification obtained by the fourth obtaining module matches the device identification in the registration table obtained, prompt that the current hardware device has been registered already.

The negotiating and storing module is configured to, when the fourth determining module determines that the device identification obtained by the fourth obtaining module does not match the device identification in the registration table obtained, negotiate the encryption key with the hardware device and store the encryption key.

The first sending module 14 is further configured to send the registration instruction to the hardware device in the registration process.

The first storing module is configured to receive the registration index received by the first receiving module stored in the registration process.

The third decrypting module is configured to decrypt the third encrypted result received by the first receiving module using the first encryption key stored.

The first storing module is further configured to store the device identification obtained by the fourth obtaining module, the first device key and the first configuration service frame service key obtained from the third encrypted result decrypted by the third decrypting module in the registration table obtained by the fifth obtaining module in correspondence to the registration index.

The hardware device 2 further includes: an updating module, a generating and storing module and a third encrypting module:

the second receiving module 21 is further configured to receive an instruction for registration sent by the computer 1 in the registration process.

the updating module is configured to update the registration index after the second receiving module 21 receives the instruction for registration;

the generating and storing module is configured to generate the second device key and the second configuration service frame key and store the second device key and the second configuration service frame key in correspondence to the registration index;

the third encrypting module is configured to encrypt the second device key and the second configuration service frame key which are generated by the generating and storing module to obtain a third encrypted result using the second encryption key stored; and the second sending module 26 is further configured to send the third encrypted result obtained by the third encrypting module and the registration index updated by the updating module to the computer.

In the present embodiment, the first initializing module is specifically configured to, when the first receiving module receive the triggering information for registration, creating monitoring for searching device according to the hardware device information and start to monitor the hardware device.

Preferably, the computer 1 in the present embodiment further includes a fifth determining module;

the first sending module 14 is further configured to send an instruction for obtaining an application to the hardware device 2 in the registration process;

the second receiving module 21 is further configured to receive the instruction for obtaining an application sent by the computer 1 in the registration process;

the second sending module 26 is further configured to return data to the computer 1 after the second receiving module 21 receives the instruction for obtaining an application;

the first receiving module 15 is further configured to receive data returned by the hardware device 2 in the registration process; and the fifth determining module is configured to determine whether the application is obtained successfully according to the data received by the first receiving module, when the application is obtained successfully, trigger the fourth obtaining module; and when the application is obtained unsuccessfully, prompt that registration is failed.

In the present embodiment, the fourth obtaining module is specifically configured to send the instruction for obtaining device identification to the hardware device 2 in the registration process, and to receive and store the device identification returned by the hardware device 2.

The second receiving module 21 is further configured to receive the instruction for obtaining device identification in the registration process.

The second sending module 26 is further configured to return the device identification to the computer 1 after the second receiving module 21 receives the instruction for obtaining device identification.

Preferably, the computer in the present embodiment further includes: a prompting and receiving module and a second storing module;

the prompting and receiving module is configured to prompt the user to input the user registration name in the registration process and receives the user registration name input by the user; and the second storing module is configured to store the user registration name received by the prompting and receiving module.

Specifically, in the present embodiment, the negotiating and storing module includes:

a first generating and storing unit, configured to generate a first key and store the first key;

a first encrypting unit, configured to encrypt a first preset data according to a preset algorithm to obtain a fifth encrypted result using the first key in the first generating and storing unit;

a first sending unit, configured to send the first key in the first generating and storing unit and the fifth encrypted result obtained by the first encrypting unit to the hardware device 2;

a first receiving unit, configured to receive the data sent by the hardware device 2;

a second obtaining unit, configured to obtain a second key and a sixth encrypted result from the data received by the first receiving unit;

a decrypting and determining unit, configured to decrypt the sixth encrypted result obtained by the second obtaining unit using the second key obtained by the second obtaining unit, determine whether the decrypted result is the first preset data, and when the decrypted result is not the first preset data, prompt that registration is failed; and the second generating and storing unit configured to generate the first encryption key according to the first key stored by the first generating and storing unit and the second key obtained by the second obtaining unit when determining result of the decrypting and determining unit is that the decrypted result is the first preset data.

The hardware device 2 further includes: an obtaining and determining module and a generating and encrypting module;

the second receiving module 21 is further configured to receive the data sent by the computer 1 in the negotiating key process;

the obtaining and determining module is configured to obtain the first key and the fifth encrypted result from the data received by the second receiving module 21, decrypt the fifth encrypted result using the first encryption key, and determine whether decrypted result is the first preset data;

the generating and encrypting module is configured to generate a second key when the determining result of the obtaining and the determining module is that the decrypted result is the first preset data, generate the second encryption key according to the first key and the second key and store the second encryption key, encrypt the decrypted result obtained by the obtaining and determining module according to a preset algorithm to obtain a sixth encrypted result using the second key; and the second sending module 26 is further configured to send the second encryption key generated by the generating and encrypting module and the sixth encrypted result encrypted and obtained by the generating and encrypting module to the computer 1, and is further configured to return an error to the computer 1 when the determining result of the obtaining and determining module is that the decrypted result is not the first preset data.

In which, the generating and encrypting module is specifically configured to generate the second key when the determining result of the obtaining and determining module is that the decrypted result is the first preset data, splice first eighth bytes of the first key and last eight bytes of the second key to obtain a second encryption key, store the second encryption key and encrypt the decrypted result according to the preset algorithm to obtain the sixth encrypted result using the second encryption.

Correspondingly, the second generating and storing unit is specifically configured to splice the first eight bytes of the first key stored and the last eight bytes of the second key obtained by the second obtaining unit to obtain the first encryption key and store the first encryption key.

Preferably, the computer of the present embodiment further includes:

a popping and prompting module, configured to pop up a box for verifying PIN code in the registration process, prompt a user to input a PIN code and receive the PIN code;

a sixth determining module, configured to determine whether the PIN code input by the user and received by the popping and prompting module is identical to the PIN code stored, when the PIN code input by the user and received by the popping and prompting module is identical to the PIN code stored, trigger the first storing module, and when the PIN code input by the user and received by the popping and prompting module is not identical to the PIN code stored, prompt that the registration is failed.

In the technical solutions of the present disclosure, by cooperating a Windows system service application of a computer with a hardware device, it may achieve an aim to log on to Windows system with version 10 or higher directly by using a hardware device registered, which improves security in a logon process. In addition, since there is no limit for a type of the hardware device, any device that can perform security computing can be used to log on, hence it is user-friendly.

The above description, are merely preferable embodiments of the present disclosure, but the scope of protection of the present disclosure is not limited thereto. Any changes or substitutions that can be easily conceived by persons skilled in the art in the technical scope in the present disclosure, should fall within the protection scope of the present disclosure. Therefore, the protection scope of the present disclosure shall be subject to the protection scope defined by the claims.

What is claimed is:

1. A method for implementing logging-on of hardware to windows system with version 10 or higher, comprising an authentication process, wherein the authentication process comprises:

Step S1, obtaining, by a computer, a device identification of a hardware device, and obtaining a first data package according to a registration index corresponding to the device identification when an insertion of the hardware device is monitored, wherein the first data package comprises: a first random number, a second random number, a first session random number and a first encryption value;

Step S2, encrypting, by the computer, the first data package to obtain a first encrypted result using a first encryption key stored; and sending, the first encrypted result and the registration index to the hardware device;

Step S3, decrypting, by the hardware device, the first encrypted result received to obtain a first decrypted result using a second encryption key stored, and verifying a second encryption value in the first decrypted result using a second configuration service frame key stored and corresponding to the registration index received, a third random number in the first decrypted result, a fourth random number in the first decrypted result, and a second session random number in the first decrypted result, when the verifying is successful, going to Step S4; and when the verifying is failed, returning error to the computer, and when the computer receives the error information, refusing, by the computer, logging on;

Step S4, generating, by the hardware device, a third encryption value and a fourth encryption value according to a second device key stored and corresponding to the registration index, the third random number in the first decrypted result and the second session random number in the first decrypted result, encrypting the third encryption value and the fourth encryption key to obtain a second encrypted result using the second encryption key, and sending the second encrypted result to the computer; and Step S5, decrypting, by the computer, the second encrypted result received to obtain a second decrypted result using the first encryption key, verifying the second decrypted result using a first device key stored and corresponding to the registration index, the first random number, and the first session random number, when the verifying is successful, permitting logon, and when the verifying is failed, refusing logon.

2. The method of claim 1, wherein after the obtaining the device identification of the hardware device and before the obtaining the first data package according to the registration index corresponding to the device identification, the method further comprises: determining, by the computer, whether the hardware device has been registered, when the hardware device has been registered, obtaining the first data package according to the registration index corresponding to the device identification, and when the hardware device has not been registered, refusing logon.

3. The method of claim 1, wherein in the Step S1, before the obtaining the device identification of the hardware device, the method further comprises:

sending, by the computer, an instruction for obtaining an application to the hardware device; returning, by the hardware device, data to the computer after receiving the instruction for obtaining an application; receiving, by the computer, the data returned by the hardware device, and determining whether the application is obtained successfully; when the application is obtained successfully, obtaining, the device identification of the hardware device; and when the application is not obtained successfully, refusing logon.

4. The method of claim 1, wherein the obtaining the device identification of the hardware device in Step S1, comprises: sending, by the computer, an instruction for obtaining the device identification to the hardware device; returning, by the hardware device, the device identification of the hardware device to the computer after receiving the instruction for obtaining the device identification; and receiving, by the computer, the device identification returned by the hardware device, and storing the device identification.

5. The method of claim 1, wherein before the obtaining the first data package according to the registration index corresponding to the device identification, the method comprises: splicing, by the computer, the second random number, the first random number, and the first session random number to obtain a first spliced result, and encrypting the first spliced result to obtain the first encryption value using the first configuration service frame key stored and corresponding to the registration index according to a preset algorithm;

in Step S3, the verifying a second encryption value in the first decrypted result using a second configuration service frame key stored and corresponding to the registration index received, a third random number in the first decrypted result, a fourth random number in the first decrypted result, and a second session random number in the first decrypted result, comprises: splicing, by the hardware device, the third random number in the first decrypted result, the fourth random number in the first decrypted result and the second session random number in the first decrypted result, to obtain a second spliced result, encrypting the second spliced result to obtain the first encrypted result using the second configuration service frame key stored and corresponding to the registration index received according to a preset algorithm; determining whether the first encrypted result is identical to the second encryption value in the first decrypted result; when the first encrypted result is identical to the second encryption value, the verifying is successful, and when the first encrypted result is not identical to the second encryption value, the verifying is failed.

6. The method of claim 1, wherein the generating, by the hardware device, a third encryption value and a fourth encryption value according to a second device key stored and corresponding to the registration index, the third random number in the first decrypted result and the second session random number in the first decrypted result, comprises: encrypting, by the hardware device, the third random number in the first decrypted result to obtain the third encryption value using the second device key stored and corresponding to the registration index according to a preset algorithm; and encrypting the second session random number in the first decrypted result to obtain the fourth encryption value using the second device key according to a preset algorithm;

in Step S5, the verifying the second decrypted result using a first device key stored and corresponding to the registration index, the first random number, and the first session random number, comprises: encrypting, by the computer, the first random number stored to obtain a fifth encryption value using the first device key stored and corresponding to the registration index according to a preset algorithm; encrypting the first session random number stored according to a preset algorithm to obtain a sixth encryption value; determining whether the fifth encryption value and the sixth encryption value match the second decrypted result; when the fifth encryption value and the sixth encryption value match the second decrypted result, the verifying is successful, when the fifth encryption value and the sixth encryption value do not match the second decrypted result, the verifying is failed, and refusing logon.

7. The method of claim 1, wherein the method further comprises a logout process, wherein the logout process comprises:
Step P1, obtaining, by the computer, a registering table when receiving deleting information selected by a user;
Step P2, determining, by the computer, whether the deleting information received matches information in the registration table, when the deleting information received matches information in the registration table, going to Step P3, and when the deleting information received does not match information in the registration table, refusing logging out; and
Step P3, prompting, by the computer, the user to confirm the deleting operation, deleting the information corresponding to the deleting information selected by the user from the registration table when receiving the confirming deleting information from the user, and ending the logout process.

8. The method of claim 1, wherein the method further comprises a registration process, the registration process comprises:
Step A1, initializing and monitoring, by the computer, the hardware device when receiving triggering information for registration;
Step A2, obtaining, by the computer, the device identification of the hardware device and a registration table, when an insertion of the hardware device is monitored;
Step A3, determining, by the computer, whether the device identification obtained matches the device identification of the registration table, when the device identification obtained matches the device identification of the registration table, prompting that the hardware device has been registered currently and the registration process is ended; otherwise, and when the device identification obtained does not match the device identification of the registration table, going to Step A4;
Step A4, negotiating, by the computer, an encryption key with the hardware device and storing the encryption key;
Step A5, sending, by the computer, a registration instruction to the hardware device;
Step A6, receiving, by the hardware device, the registration instruction, updating the registration index, generating a second device key and a second configuration service frame key and storing the second device key and the second configuration service frame key corresponding to the registration index, and encrypting the second device key and the second configuration service frame key to obtain a third encrypted result using the second encryption key stored;
Step A7, sending, by the hardware device, the third encrypted result and the registration index to the computer;
Step A8, storing, by the computer, the registration index received, and decrypting the third encrypted result received using the first encryption key stored; and
Step A9, storing, by the computer, the device identification, the first device key obtained by decrypting the third encrypted result and the first configuration service frame key in the registration table corresponding to the registration index.

9. The method of claim 8, wherein before the obtaining the device identification of the hardware device in Step A2, the method further comprises:
sending, by the computer, an instruction for obtaining an application to the hardware device; returning, by the hardware device, data to the computer after receiving the instruction for obtaining an application; receiving, by the computer, the data returned by the hardware device and determining whether the application is obtained successfully according to the data received, when the application is obtained successfully, obtaining the device identification of the hardware device; and when the application is not obtained successfully, prompting that the registration is failed.

10. The method of claim 8, wherein the Step A4 comprises:
Step A41, generating and storing, by the computer, a first key, encrypting a first preset data to obtain a fifth encrypted result using the first key according to a preset algorithm, and sending the first key and the fifth encrypted result to the hardware device;

Step A42, receiving, by the hardware device, the first key and the fifth encrypted result sent by the computer, decrypting the fifth encrypted result using the first key, determining whether a decrypted result is the first preset data, when the decrypted result is the first preset data, going to Step A43, and when the decrypted result is not the first preset data, returning registration error information to the computer, and ending the process;

Step A43, generating, by the hardware device, a second key, generating a second encryption key according to the first key and the second key and storing the second encryption key; encrypting the decrypted result to obtain a sixth encrypted result using the second key according to a preset algorithm, and sending the second key and the sixth encrypted result to the computer;

Step A44, receiving, by the computer, the second key and the sixth encrypted result sent by the hardware device, decrypting the sixth encrypted result using the second key, determining whether the decrypted result is the first preset data, when the decrypted result is the first preset data, going to Step A45; and when the decrypted result is not the first preset data, prompting that the registration is failed, and ending the process; and Step A45, generating, by the computer, a first encryption key according to the first key stored and the second key obtained, and storing the first encryption key.

11. An apparatus for implementing logging-on of hardware to windows system with version 10 or higher, comprising a computer and a hardware device; wherein the computer comprises:

a first obtaining module, configured to obtain a device identification of the hardware device when an insertion of the hardware device is monitored by the computer in an authentication process;

a second obtaining module, configured to obtain a first data package according to a registration index corresponding to the device identification obtained by the first obtaining module, the first data package comprises: a first random number, a second random number, a first session random number and a first encryption value;

a first encrypting module, configured to encrypt the first data package obtained by the second obtaining module to obtain a first encrypted result using the first encryption key stored;

a first sending module, configured to send the registration index and the first encrypted result obtained by the first encrypting module to the hardware device;

a first receiving module, configured to receive a second encrypted result or error information sent by the hardware device in the authentication process;

a first decrypting module, configured to decrypt the second encrypted result received by the first receiving module to obtain a second decrypted result using the first encryption key stored;

a first verifying module, configured to verify the second decrypted result obtained by the first decrypting module using a first device key stored and corresponding to the registration index, the first random number and the first session random number;

a logon permitting module, configured to permit logon when the first verifying module verifies successfully; and a logon refusing module, configured to refuse logon when the first receiving module receives the error information or the first verifying module verifies unsuccessfully; and the hardware device comprises:

a second receiving module, configured to receive the first encrypted result and the registration index which are sent by the computer in the authentication process;

a second decrypting module, configured to decrypt the first encrypted result received by the second receiving module to obtain the first decrypted result using a second encryption key stored;

a second verifying module, configured to verify a second encryption value in the first decrypted result received by the second receiving module using a second configuration service frame key stored and corresponding to the registration index received by the second receiving module, and a third random number, a fourth random number and a second session random number which are in the first decrypted result obtained by the second decrypting module;

a first generating module, configured to generate a third encryption value and a fourth encryption value according to a second device key stored and corresponding to the registration index received by the second receiving module, the third random number and the second session random number in the first decrypted result obtained by the second receiving module when verifying of the second verifying module is successful;

a second encrypting module, configured to encrypt the third encryption value and the fourth encryption value which are generated by the first generating module to obtain a second encrypted result using the second encryption key; and a second sending module, configured to return error information to the computer when verifying of the second verifying module is failed; and further configured to send the second encrypted result obtained by the second encrypting module to the computer.

12. The apparatus of claim 11, wherein the computer further comprises:

a first determining module, configured to determine whether the hardware device has been registered in the authentication process, when the hardware device has been registered in the authentication process, trigger the second obtaining module, and when the hardware device has not been registered in the authentication process, trigger a logon refusing module; and the logon refusing module is further configured to refuse logon when determining result of the first determining module is that the hardware device has not been registered in the authentication process.

13. The apparatus of claim 11, wherein the computer further comprises a second determining module;

the first sending module is further configured to send an instruction for obtaining an application to the hardware device;

the second receiving module is further configured to receive the instruction for obtaining an application from the computer; and the second sending module is further configured to return data to the computer; and the first receiving module is further configured to receive the data returned by the hardware device;

the second determining module is configured to determine whether the application is obtained successfully according to the data received by the first receiving module, and when the application is obtained successfully, trigger the first obtaining module, and when the application is obtained unsuccessfully, trigger the logon refusing module; and the logon refusing module is further configured to refuse logon when determining of the second determining result is that the application is obtained unsuccessfully.

14. The apparatus of claim 11, wherein the first obtaining module specifically is configured to send an instruction for obtaining device identification to the hardware device, and to receive the device identification returned by the hardware device and store the device identification;

the second receiving module is further configured to receive the instruction for obtaining the device identification; and the second sending module is configured to return the device identification of the hardware device to the computer after the second receiving module receives the instruction for obtaining the device identification.

15. The apparatus of claim 11, wherein the computer further comprises:

a splicing and encrypting module, configured to splice the second random number, the first random number, the first session random number to obtain a first spliced result, encrypt the first spliced result according to a preset algorithm to obtain the first encryption value using a first configuration service frame key stored and corresponding to the registration index; and the second verifying module is specifically configured to splice the third random number, the fourth random number and the second session random number in the first decrypted result obtained by the second decrypting module to obtain a second spliced result, to encrypt the second spliced result according to a preset algorithm to obtain a first encrypted result using the second configuration service frame key stored and corresponding to the registration index received by the second receiving module, and to determine whether the first encrypted result and the second encryption value in the first encrypted result received by the second receiving module are identical, when the first encrypted result and the second encryption value in the first encrypted result received by the second receiving module are identical, verifying is successful; when the first encrypted result and the second encryption value in the first encrypted result received by the second receiving module are not identical, verifying is failed.

16. The apparatus of claim 11, wherein the first generating module is specifically configured to, when verifying of the second verifying module is successful, encrypt a third random number in the first decrypted result obtained by the second decrypting module according to the preset algorithm to obtain the third encryption value using the second device key corresponding to the registration index received by the second receiving module, and encrypt the second session random number in the first decrypted result obtained by the second decrypting module to obtain a fourth encryption value according to a preset algorithm using the second device key; and the first verifying module is specifically configured to: encrypt the first random number stored according to preset algorithm to obtain a fifth encryption value using the first device key stored and corresponding to the registration index, encrypt the first session random number stored according to a preset algorithm to obtain a sixth encryption value using the first device key, determine whether the fifth encryption value and the sixth encryption value matches the second decrypted result, when the fifth encryption value and the sixth encryption value matches the second decrypted result, verifying is successful and logon is permitted; and when the fifth encryption value and the sixth encryption value does not match the second decrypted result, verifying is failed and logon is refused.

17. The apparatus of claim 11, wherein the computer further comprises: a third obtaining module, a third determining module and a deleting confirming module;

the first receiving module is further configured to receive deleting information selected by a user in a logout process;

the third obtaining module is configured to obtain a registration table after the first receiving module receives the deleting information;

the third determining module is configured to determine whether the deleting information received by the first receiving module matches the information in the registration table obtained by the third obtaining module, and when the deleting information received by the first receiving module does not match the information in the registration table obtained by the third obtaining module, to refuse logout; and the deleting confirming module is configured to prompt the user to confirm deleting information when determining result of the third determining module is that the deleting information received by the first receiving module matches the information in the registration table obtained by the third obtaining module, and to delete the information corresponding to the deleting information selected by the user from the registration table when information for confirming deleting is received from the user.

18. The apparatus of claim 11, wherein the computer further comprises a first initializing module, a fourth obtaining module, a fifth obtaining module, a fourth determining module, a negotiating and storing module, a third decrypting module and a first storing module;

the first receiving module is configured to receive triggering information for registration in a registration process and to receive the registration index and a third encrypted result which are sent by the hardware device;

the first initializing module is configured to initialize and start monitoring the hardware device when the first receiving module receives the triggering information for registration;

the fourth obtaining module is configured to obtain the device identification of the hardware device when the first initializing module monitors an insertion of the hardware device;

the fifth obtaining module is configured to obtain a registration table in the registration process;

the fourth determining module is configured to determine whether the device identification obtained by the fourth obtaining module matches the device identification in the registration table obtained, when the device identification obtained by the fourth obtaining module matches the device identification in the registration table obtained, to prompt that the current hardware device has been registered already;

the negotiating and storing module is configured to negotiate the encryption key with the hardware device and store the encryption key, when the fourth determining module determines that the device identification obtained by the fourth obtaining module does not match the device identification in the registration table obtained;

the first sending module is further configured to send the registration instruction to the hardware device in the registration process;

the first storing module is configured to store the registration index received by the first receiving module in the registration process;

the third decrypting module is configured to decrypt the third encrypted result received by the first receiving module using the first encryption key stored; and the first storing module is further configured to store the device identification obtained by the fourth obtaining module, the first device key and the first configuration service frame service key obtained from the third encrypted result by decrypting by the third decrypting module in the registration table obtained by the fifth obtaining module in correspondence to the registration index; and wherein the hardware device further comprises: an updating module, a generating and storing module and a third encrypting module;

the second receiving module is further configured to receive an instruction for registration sent by the computer in the registration process;

the updating module is configured to update the registration index after the second receiving module receives the instruction for registration;

the generating and storing module is configured to generate the second device key and the second configuration service frame key and store the second device key and the second configuration service frame key in correspondence to the registration index;

the third encrypting module is configured to encrypt the second device key and the second configuration service frame key which are generated by the generating and storing module to obtain a third encrypted result using the second encryption key stored; and the second sending module is further configured to send the third encrypted result obtained by the third encrypting module and the registration index updated by the updating module to the computer.

19. The apparatus of claim 18, wherein the computer further comprises: a fifth determining module;

the first sending module is further configured to send an instruction for obtaining an application to the hardware device in the registration process;

the second receiving module is further configured to receive the instruction for obtaining an application sent by the computer in the registration process;

the second sending module is further configured to return data to the computer after the second receiving module receives the instruction for obtaining an application;

the first receiving module is further configured to receive data returned by the hardware device in the registration process; and the fifth determining module is configured to determine whether the application is obtained successfully according to the data received by the first receiving module, when the application is obtained successfully, to trigger the fourth obtaining module, and when the application is obtained unsuccessfully, prompt that registration is failed.

20. The apparatus of claim 18, wherein the negotiating and storing module comprises:

a first generating and storing unit, configured to generate a first key and store the first key;

a first encrypting unit, configured to encrypt a first preset data according to a preset algorithm to obtain a fifth encrypted result using the first key in the first generating and storing unit;

a first sending unit, configured to send the first key in the first generating and storing unit and the fifth encrypted result obtained by the first encrypting unit to the hardware device;

a first receiving unit, configured to receive the data sent by the hardware device;

a second obtaining unit, configured to obtain a second key and a sixth encrypted result from the data received by the first receiving unit;

a decrypting and determining unit, configured to decrypt the sixth encrypted result obtained by the second obtaining unit using the second key obtained by the second obtaining unit, determine whether the decrypted result is the first preset data, and when the decrypted result is not the first preset data, prompt that registration is failed; and the second generating and storing unit, configured to generate the first encryption key according to the first key stored by the first generating and storing unit and the second key obtained by the second obtaining unit when determining result of the decrypting and determining unit is that the decrypted result is the first preset data; and wherein the hardware device further comprises: an obtaining and determining module and a generating and encrypting module;

the second receiving module further is configured to receive the data sent by the computer in the negotiating key process;

the obtaining and determining module is configured to obtain the first key and the fifth encrypted result from the data received by the second receiving module, to decrypt the fifth encrypted result using the first key and determine whether a decrypted result is the first preset data;

the generating and encrypting module is configured to generate a second key when the determining result of the obtaining and determining module is that the decrypted result is the first preset data, generate the second encryption key according to the first key and the second key and store the second encryption key, and encrypt the decrypted result obtained by the obtaining and determining module according to a preset algorithm to obtain a sixth encrypted result using the second key; and the second sending module is further configured to send the second encryption key generated by the generating and encrypting module and the sixth encrypted result obtained by the generating and encrypting module to the computer, and is further configured to return error information to the computer when the determining result of the obtaining and determining module is that the decrypted result is not the first preset data.

* * * * *